United States Patent
Levitsky et al.

(10) Patent No.: US 12,432,025 B2
(45) Date of Patent: Sep. 30, 2025

(54) CONFIGURATIONS AND DYNAMIC SIGNALING FOR DOPPLER TRACKING SOUNDING REFERENCE SIGNAL RESOURCE SETS

(71) Applicant: QUALCOMM Incorporated, San Diego, CA (US)

(72) Inventors: Michael Levitsky, Rehovot (IL); Muhammad Sayed Khairy Abdelghaffar, San Jose, CA (US); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 17/652,270

(22) Filed: Feb. 23, 2022

(65) Prior Publication Data
US 2022/0368485 A1    Nov. 17, 2022

Related U.S. Application Data

(60) Provisional application No. 63/186,539, filed on May 10, 2021.

(51) Int. Cl.
*H04L 5/00*    (2006.01)

(52) U.S. Cl.
CPC .......... *H04L 5/0048* (2013.01); *H04L 5/0051* (2013.01); *H04L 5/0094* (2013.01)

(58) Field of Classification Search
CPC .... H04L 5/0048; H04L 5/0094; H04L 5/0051
See application file for complete search history.

(56) References Cited

U.S. PATENT DOCUMENTS

| | | | |
|---|---|---|---|
| 2019/0349964 A1* | 11/2019 | Liou | H04B 7/0626 |
| 2020/0007294 A1* | 1/2020 | Yang | H04L 5/0094 |

(Continued)

FOREIGN PATENT DOCUMENTS

| | | |
|---|---|---|
| JP | 2011193124 A | 9/2011 |
| WO | WO-2020095419 A1 | 5/2020 |

(Continued)

OTHER PUBLICATIONS

Nokia, et al., "Alignment of RRC Parameter Names for 38.214", 3GPP TSG-RAN WG1 Meeting #103-e, R1-2008292, 3GPP, Mobile Competence Centre, 650, Route Des Lucioles, F-06921 Sophia-Antipolis Cedex, France, vol. RAN WG1, No. e-Meeting, Oct. 26, 2020-Jan. 11, 2020, Oct. 16, 2020, XP051939520, 139 Pages, URL: (Year: 2020).*

(Continued)

*Primary Examiner* — Michael K Phillips
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information for a sounding reference signal (SRS) resource set, the configuration information indicating a usage type for the SRS resource set associated with Doppler tracking and a configuration for one or more associated SRS resource identifiers. Some configuration parameters of the SRS resource set and the associated SRS resource identifiers can be dynamically reconfigured in order to allow adaptive SRS time domain pattern for enhanced Doppler parameter estimation and/or synchronization loop tracking, among other examples. The UE may transmit one or more SRSs in accordance with the configuration or dynamic reconfiguration information for the SRS resource set and the associated SRS resources based at least (Continued)

in part on receiving the configuration and/or reconfiguration information. Numerous other aspects are described.

30 Claims, 12 Drawing Sheets

(56) References Cited

U.S. PATENT DOCUMENTS

| | | | |
|---|---|---|---|
| 2020/0213054 A1 | 7/2020 | Park et al. | |
| 2021/0400668 A1 | 12/2021 | Matsumura et al. | |
| 2022/0116979 A1 | 4/2022 | Park et al. | |
| 2022/0399974 A1* | 12/2022 | Li | H04L 5/0023 |
| 2023/0064231 A1* | 3/2023 | Haghighat | H04W 72/23 |
| 2023/0291523 A1* | 9/2023 | Hasegawa | H04L 5/0094 |

FOREIGN PATENT DOCUMENTS

| | | |
|---|---|---|
| WO | WO-2020162716 A1 | 8/2020 |
| WO | WO-2021075520 A1 | 4/2021 |

OTHER PUBLICATIONS

3GPP TS 38.211: "3rd Generation Partnership Project, Technical Specification Group Radio Access Network, NR, Physical Channels and Modulation (Release 16)", V16.4.0 (Dec. 2020), 129 Pages.
3GPP TS 38.214: "3rd Generation Partnership Project, Technical Specification Group Radio Access Network, NR, Physical Layer Procedures for Data (Release 15)", 3GPP Standard, Technical Specification, 3GPP, Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, Jun. 1, 2018.
3GPP TS 38.215: "3rd Generation Partnership Project, Technical Specification Group Radio Access Network, NR, Physical Layer Measurements (Release 16)", V16.5.0 (Mar. 2022), 24 Pages.
International Search Report and Written Opinion—PCT/US2022/070814—ISA/EPO—Jun. 15, 2022.
Moderator (Intel Corporation): "Summary#4 of AI: 8.1.2.4 Enhancements on HST-SFN Deployment", 3GPP TSG RAN WG1 #104-e, R1-2102214, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 58 Pages, Feb. 8, 2021, XP051977776, URL: https://ftp.3gpp.org/tsg_ran/WG1_RL1/TSGR1_104-e/Docs/R1-2102214.zip R1-2102214.docx.
Moderator (Intel Corporation): "Summary#3 of AI: 8.1.2.4 Enhancements on HST-SFN Deployment", 3GPP TSG RAN WG1 #104-e, R1-2102139, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 3 Pages, Feb. 4, 2021, XP051976097, URL: https://ftp.3gpp.org/tsg_ran/WG1_RL1/TSGR1_104-e/Inbox/R1-2102139.zip R1-2102139.docx.
Nokia, et al., "Alignment of RRC Parameter Names for 38.214", 3GPP TSG-RAN WG1 Meeting #103-e, R1-2008292, 3GPP, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020, XP051939520, 139 Pages, URL: https://ftp.3gpp.org/tsg_ran/WG1_RL1/TSGR1_103-e/Docs/R1-2008292.zip R1-2008292.docx.

* cited by examiner

| Scenario | Channel Type | Time gap for Doppler shift estimation | Time gap for Doppler spread estimation |
|---|---|---|---|
| HST + Train mounted UE | Slow channel time correlation decay per TRP (CDL+strong LOS channel) | Up to 6 OFDM symbols | Multiple OFDM symbols |
| HST + UE located in the train | Fast channel time correlation decay per TRP (Rician/Rayleigh channel) | 1 or 2 OFDM symbols | Approximately half of a slot |
| Mobile UE | Fast channel time correlation decay per TRP (Rayleigh channel) | 1 or 2 OFDM symbols | Approximately half of a slot |

FIG. 5B

CONFIGURATIONS AND DYNAMIC SIGNALING FOR DOPPLER TRACKING SOUNDING REFERENCE SIGNAL RESOURCE SETS

CROSS-REFERENCE TO RELATED APPLICATION

This Patent Application claims priority to U.S. Provisional Patent Application No. 63/186,539, filed on May 10, 2021, entitled "CONFIGURATIONS AND DYNAMIC SIGNALING FOR DOPPLER TRACKING SOUNDING REFERENCE SIGNAL RESOURCE SETS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configurations and dynamic signaling for Doppler tracking sounding reference signal (SRS) resource sets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes memory, one or more processors coupled to the memory, the memory comprising instructions executable by the one or more processors to cause the UE to: receive configuration information for a sounding reference signal (SRS) resource set, the configuration information indicating a usage type for the SRS resource set associated with Doppler tracking and a configuration for one or more SRS resource identifiers; and transmit one or more SRSs in accordance with the configuration information for the SRS resource set based at least in part on receiving the configuration information.

In some aspects, a network entity for wireless communication includes memory, one or more processors coupled to the memory, the memory comprising instructions executable by the one or more processors to cause the network entity to: transmit, to a UE, configuration information for an SRS resource set, the configuration information indicating a usage type for the SRS resource set associated with Doppler tracking and a configuration for one or more SRS resource identifiers; and receive one or more SRSs in accordance with the configuration information for the SRS resource set based at least in part on receiving the configuration information.

In some aspects, a method of wireless communication performed by a UE includes receiving configuration information for an SRS resource set, the configuration information indicating a usage type for the SRS resource set associated with Doppler tracking and a configuration for one or more SRS resource identifiers; and transmitting one or more SRSs in accordance with the configuration information for the SRS resource set based at least in part on receiving the configuration information.

In some aspects, a method of wireless communication performed by a network entity includes transmitting, to a UE, configuration information for an SRS resource set, the configuration information indicating a usage type for the SRS resource set associated with Doppler tracking and a configuration for one or more SRS resource identifiers; and receiving one or more SRSs in accordance with the configuration information for the SRS resource set based at least in part on receiving the configuration information.

In some aspects, a non-transitory computer-readable medium stores one or more instructions for wireless communication, the one or more instructions, when executed by one or more processors of a UE, cause the UE to: receive configuration information for an SRS resource set, the configuration information indicating a usage type for the SRS resource set associated with Doppler tracking and a configuration for one or more SRS resource identifiers; and transmit one or more SRSs in accordance with the configuration information for the SRS resource set based at least in part on receiving the configuration information.

In some aspects, a non-transitory computer-readable medium stores one or more instructions for wireless communication, the one or more instructions, when executed by one or more processors of a network entity, cause the network entity to: transmit, to a UE, configuration information for an SRS resource set, the configuration information indicating a usage type for the SRS resource set associated with Doppler tracking and a configuration for one or more SRS resource identifiers; and receive one or more SRSs in accordance with the configuration information for the SRS resource set based at least in part on receiving the configuration information.

In some aspects, an apparatus for wireless communication includes means for receiving configuration information for an SRS resource set, the configuration information indicating a usage type for the SRS resource set associated with Doppler tracking and a configuration for one or more SRS resource identifiers; and means for transmitting one or more SRSs in accordance with the configuration information for the SRS resource set based at least in part on receiving the configuration information.

In some aspects, an apparatus for wireless communication includes means for transmitting, to a UE, configuration information for an SRS resource set, the configuration information indicating a usage type for the SRS resource set associated with Doppler tracking and a configuration for one or more SRS resource identifiers; and means for receiving one or more SRSs in accordance with the configuration information for the SRS resource set based at least in part on receiving the configuration information.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating an example of uplink Doppler parameter estimation considerations, in accordance with the present disclosure.

DETAILED DESCRIPTION

Figure 1:
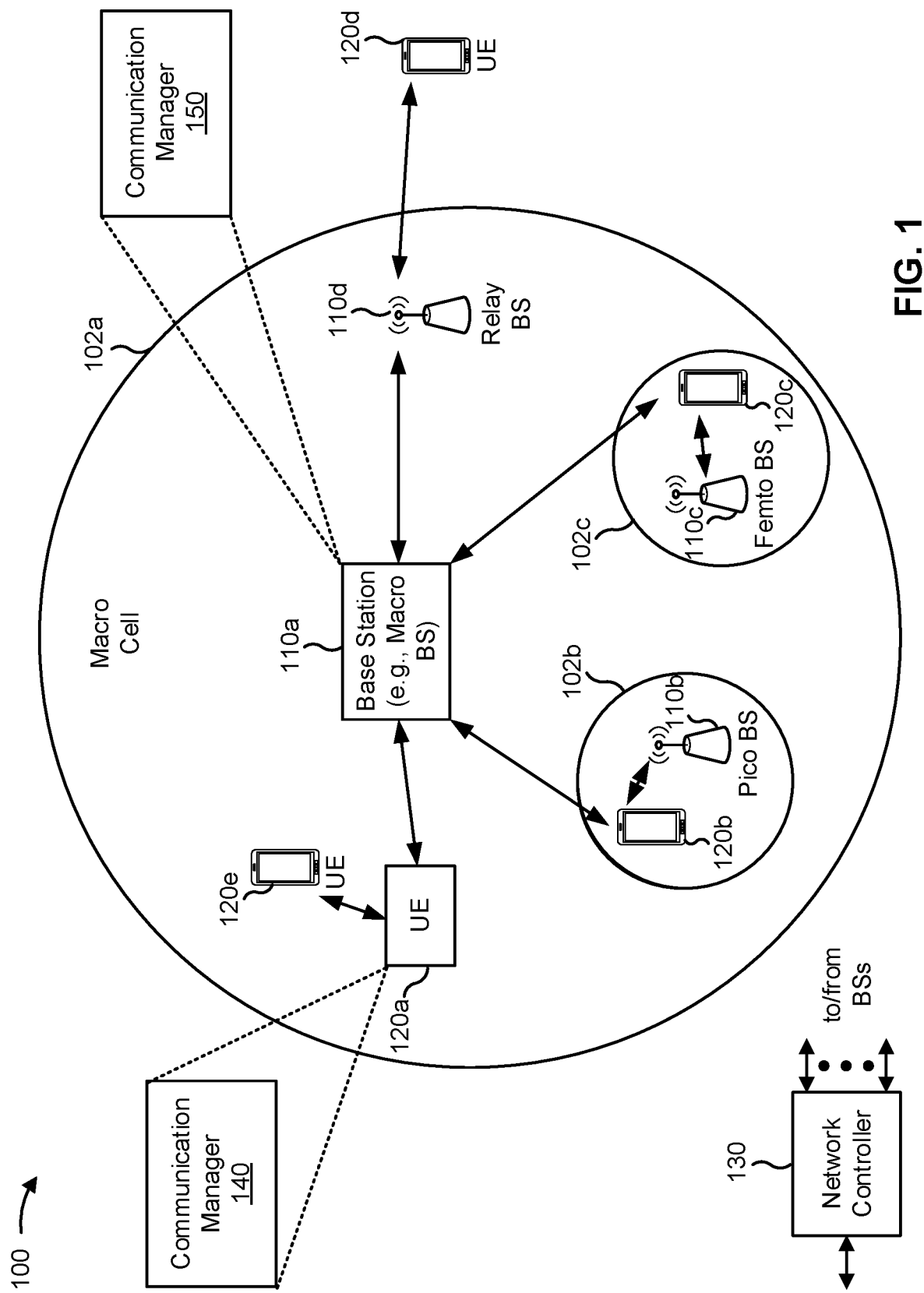
FIG. 1 is a diagram illustrating an example of a wireless network, in accordance with the present disclosure.

Reference signals may be used to increase the reliability and efficiency of communications between wireless devices. For example, a base station may measure an uplink reference signal to select a configuration or other transmission parameters for communications between the base station and a user equipment (UE). For example, the base station may measure an uplink reference signal to estimate a delay spread, signal-to-noise ratio (SNR), and/or a Doppler parameter (e.g., Doppler shift or Doppler spread/channel time correlation) associated with the uplink channel, among other examples.

For example, an uplink demodulation reference signal (DMRS) may be used to estimate parameters associated with an uplink communications channel between a base station and a UE. Because different configurations of the uplink DMRS may be better suited for different channel conditions, a base station may dynamically select an uplink DMRS configuration for use based on one or more channel parameters that reflect the conditions of the uplink channel between the base station and the UE. For example, the base station may select an uplink DMRS configuration for an uplink channel based on the delay spread, SNR, and/or a Doppler parameter (e.g., Doppler shift or Doppler spread) associated with the uplink channel, among other examples. For example, the base station may use an estimated uplink Doppler spread or uplink channel time correlation to select a DMRS configuration for a UE, as described in more detail herein.

However, Doppler parameters for the uplink channel ("uplink Doppler parameters"), such as a Doppler shift or a Doppler spread, may not be known to the BS or may not be estimated with a required accuracy, which may prevent the base station from selecting an uplink DMRS configuration that is properly tailored to the conditions of the uplink channel or from accurately pre-compensating for the Doppler parameters experienced by a UE in the downlink. Although the base station may estimate Doppler parameters by measuring uplink reference signals from the UE, the estimation may be inaccurate or unreliable because the reference signals transmitted by the UE may be ill-suited for Doppler parameter estimation. For example, the temporal spacing between repetitions of a reference signal may be too large, small, or inconsistent for an accurate Doppler parameters estimation given the subcarrier spacing, carrier frequency and UE speeds or Doppler shifts range or channel type experience by the UE or by a communication link.

Additionally, or alternatively, in high mobility environments (e.g., environments in which the UE is traveling at high rates of speed, such as 500 kilometers per hour (km/h) or similar speeds), accurate Doppler parameter estimation may be needed for efficient Doppler pre-compensation (e.g., to enable a base station to compensate for a frequency offset associated with a Doppler shift in the high mobility environment for one or more transmit-receive points (TRPs) involved in a multiple TRP (mTRP) transmission to a UE, such as in a high speed train (HST) single frequency network (SFN) scheme). For example, in an HST scenario (e.g., where the UE is mounted on a train or is located inside of a train), the base station may pre-compensate for a Doppler shift experienced due to the high rate of speed (e.g., the base station may apply Doppler shift pre-compensation for each, or at least one, TRP based on a Doppler shift reported to the base station by the UE. In some cases, the base station may apply Doppler shift pre-compensation based on implicit reporting of the Doppler shift by a UE where the UE transmits reference signals (e.g., SRSs) using a frequency offset (e.g., associated or determined based on the measured downlink Doppler shift for one or more TRPs). Therefore, in some cases, the base station may estimate an uplink Doppler shift (e.g., as indicated by the UE) to be used to determine the Doppler shift pre-compensation in downlink for each TRP for transmissions to the UE based on an SRS transmission from the UE.

Moreover, different Doppler parameter estimations may require different temporal spacings between repetitions of a reference signal. For example, in scenarios where high Doppler shift is relevant (e.g., in high mobility scenarios, such as an HST scenario) and where meaningful Doppler spread is also experienced (such as a non-line of site (LOS) channel where there is not a clear LOS between the UE and a TRP), it may be beneficial to estimate the uplink Doppler shift based on a relatively small time gap between repetitions of a reference signal (e.g., to enable the base station to decorrelate the Doppler shift estimation from the time coherency decay caused by the experienced Doppler spread). Conversely, a reliability of a Doppler spread estimation may be improved by using a time gap of multiple symbols (e.g., based on a channel profile, UE speed, and/or other parameters). Therefore, in scenarios where a base station is to estimate both high uplink Doppler shift and uplink Doppler spread (such as in an HST scenario) using an uplink reference signal (such as an SRS, for example), different time gaps between repetitions of the uplink reference signal may be required for estimating the different Doppler parameters. Additionally, as channel parameters or deployment parameters (e.g., a channel type, UE speeds, Doppler shift range, SNR, subcarrier spacing configured to the UE or a carrier frequency configured to the UE) change, a proper time gap for uplink Doppler parameter estimation may change. Therefore, it may be difficult to configure a fixed uplink reference signal time domain pattern having a single time gap to enable a base station to properly estimate multiple Doppler parameters using the same uplink reference signal repetitions transmission or occurrence/scheduling.

Some techniques and apparatuses described herein enable configurations for Doppler tracking SRS resource sets. "Doppler tracking SRS" may refer to an SRS that can be used by a base station to measure or estimate uplink Doppler spread and/or uplink Doppler shift. As another example, a Doppler tracking SRS may enable a UE or a base station to perform synchronization loop (or frequency offset) tracking. For example, an additional SRS usage type may be defined, associated with a Doppler tracking SRS. In some aspects, a base station may be enabled to configure one or more SRS resources (e.g., using one or more SRS resource identifiers). The configured SRS resources may be associated with similar (or the same) configurations other than intra-slot starting location for each SRS resource. In other words, the base station may be enabled to configure different starting symbol locations for different SRS resources (e.g., included in the SRS resource set) within the same slot such that a time domain pattern with several repetitions of Doppler tracking SRS symbols may be obtained within the slot. The SRS resource set and the corresponding SRS resources associated with the SRS resource set may be a periodic SRS, a semi-persistent SRS, or an aperiodic SRS.

Additionally, some techniques and apparatuses described herein enable dynamic reconfigurations for Doppler tracking SRS resource set and associated SRS resources. For example, a base station may be enabled to dynamically reconfigure an intra slot starting symbol location for different SRS resources (e.g., included in the SRS resource set) in order to dynamically adjust a time gap between the different SRS resources within the same slot. Additionally, or alternatively, the base station may be enabled to dynamically activate or deactivate one or more SRS resources (e.g., included in the SRS resource set) to conserve SRS overhead if this one or more SRS resources are not needed for uplink Doppler parameters estimation or do not further improve Doppler parameters estimation accuracy or link quality.

As a result, a flexible dynamic reconfiguration for Doppler tracking SRS resource set and associated SRS resources may be provided to enable a base station to adjust Doppler tracking SRS configurations based at least in part on Doppler parameter(s) to be measured, a channel type, SNR, one or more channel parameters, a speed range of the UE, allocation scenario, and/or one or more deployment parameters, among other examples. This may improve an accuracy of Doppler parameter estimations by enabling the base station to dynamically reconfigure different time gaps or pilot spacings between SRS resources or SRS symbols (e.g., for different Doppler parameter estimations) associated with the same SRS resource set. Additionally, the base station may be enabled to dynamically reconfigure the SRS resource set or SRS resources based at least in part on changing channel conditions, SNR, changing UE speed, and/or changing deployment parameters, among other examples. Additionally, an overhead associated with configuring and/or transmitting the SRSs for Doppler tracking purposes may be reduced. Moreover, the configurations described herein with a flexible reconfiguration option may provide additional scheduling flexibility for a base station to enable the base station to schedule other uplink transmissions in a same slot (e.g., for the UE transmitting the SRS and/or for other UEs).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a TRP, or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive configuration information for an SRS resource set, the configuration information indicating a usage type for the SRS resource set associated with Doppler tracking and a configuration for one or more SRS resource identifiers; and transmit one or more SRSs in accordance with the configuration information for the SRS resource set based at least in part on receiving the configuration information. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, configuration information for an SRS resource set, the configuration information indicating a usage type for the SRS resource set associated with Doppler tracking and a configuration for one or more SRS resource identifiers; and receive one or more SRSs in accordance with the configuration information for the SRS resource set based at least in part on transmitting the configuration information.

Additionally, or alternatively, the communication manager 150 may perform one or more other operations described herein.

As indicated above, FIG. 1 is provided as an example. Other examples may differ from what is described with regard to FIG. 1.

Figure 2:
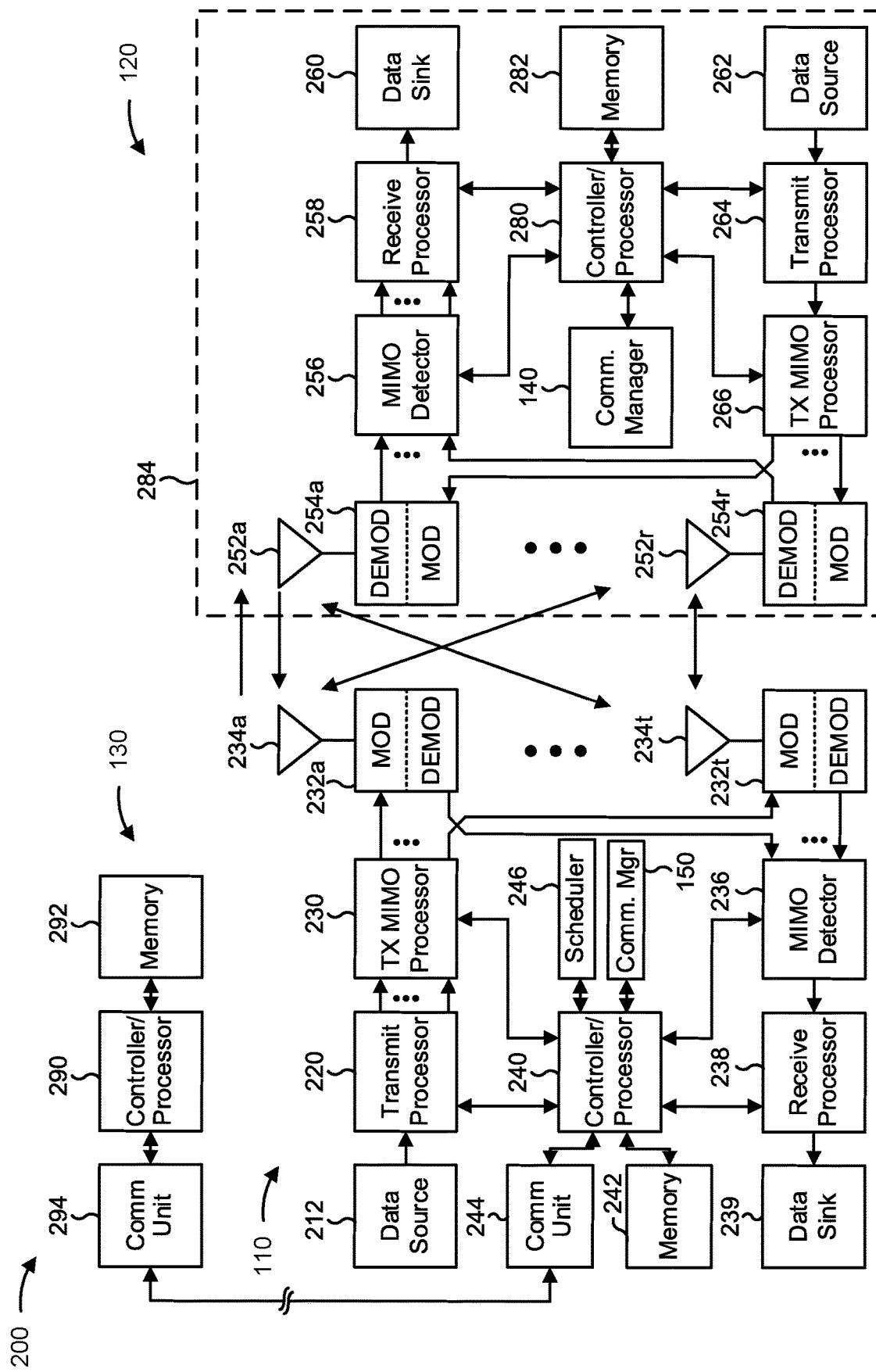
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-11).

Controller/processor 240 of base station 110, controller/processor 280 of UE 120, and/or any other component(s) of FIG. 2 may perform one or more techniques associated with configurations and dynamic signaling for Doppler tracking SRS resource sets and the associated SRS resources, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving configuration information for an SRS resource set, the configuration information indicating a usage type for the SRS resource set associated with Doppler tracking and a configuration for one or more SRS resource identifiers; and/or means for transmitting one or more SRSs in accordance with the configuration information for the SRS resource set based at least in part on receiving the configuration information. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE 120, configuration information for an SRS resource set, the configuration information indicating a usage type for the SRS resource set associated with Doppler tracking and a configuration for one or more SRS resource identifiers; and/or means for receiving one or more SRSs in accordance with the configuration information for the SRS resource set based at least in part on transmitting the configuration information. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
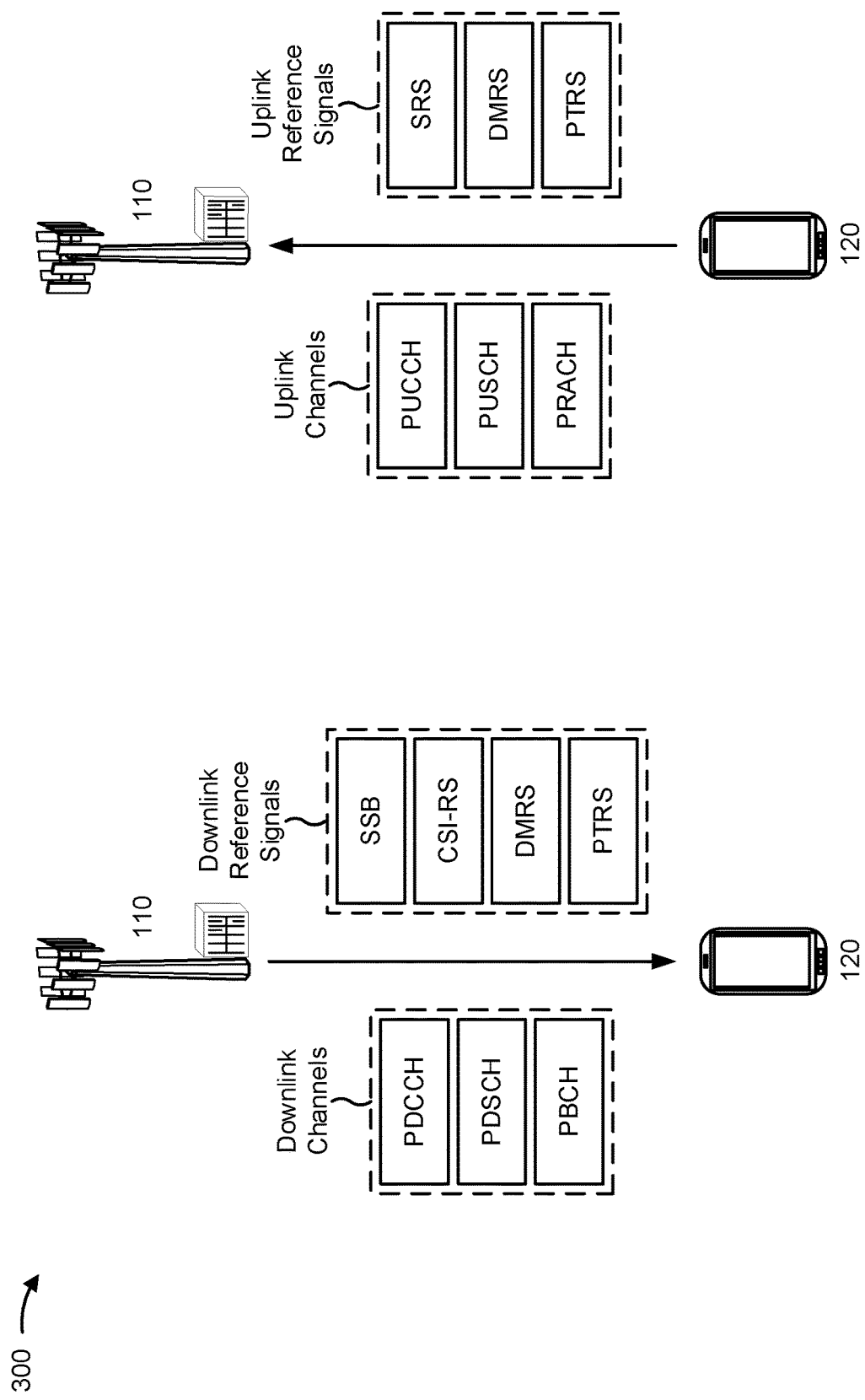
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgment (ACK) or negative acknowledgment (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), a phase tracking reference signal (PTRS), and/or a tracking reference signal (TRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A TRS may be a downlink reference signal (not shown in FIG. 3) and may carry information used to assist in time domain and frequency domain tracking. The TRS may be used to track transmission path delay spread and/or Doppler spread. A TRS may be UE-specific. In some aspects, a TRS may be transmitted in a TRS burst. A TRS burst may consist of four OFDM symbols in two consecutive slots. In some aspects, a TRS may be associated with one or more CSI-RS configurations. For example, a TRS burst may use one or more CSI-RS resources.

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage (e.g., as described in more detail elsewhere herein). In some examples, an SRS may be used for uplink CSI acquisition, downlink CSI acquisition for reciprocity-based operations, and/or uplink beam management, among other examples. The base station 110 may measure the SRSs, may perform channel estimation based at least in part on the measurements, and may use the SRS measurements to configure communications with the UE 120.

Reference signals may be used to increase the reliability and efficiency of communications between wireless devices. For example, a base station 110 may measure an uplink reference signal to select a configuration or other transmission parameters for communications between the base station 110 and a UE 120. For example, the base station 110 may measure an uplink reference signal to estimate a delay spread, SNR, and/or a Doppler parameter (e.g., Doppler shift or Doppler spread) associated with the uplink channel, among other examples.

"Doppler shift" refers to a shift or change in a frequency of a signal between a transmitter and a receiver. Doppler shift may sometimes be referred to as a frequency offset. For example, Doppler shift may occur when a transmitter of a signal is moving in relation to the receiver. The relative movement may shift the frequency of the signal, making the frequency of the signal received at the receiver different than the frequency of the signal transmitted at the transmitter. In other words, the frequency of the signal received by the receiver differs from the frequency of the signal that was originally emitted. "Doppler spread" refers to the widening of a spectrum of a narrow-band signal transmitted through a multipath propagation channel. Doppler spread may be caused by different Doppler shifts associated with the multiple propagation paths when there is relative motion between the transmitter and the receiver. For example, when there is no relative motion between the transmitter and the receiver, due to the multipath propagation channel, the receiver can receive the same signal at different times, because one copy of the signal uses a shorter path and arrives quickly, whereas another copy of the signal may user a longer path. Where there is relative motion between the transmitter and the receiver, signals on the different paths may arrive at the receiver at different times and with different frequencies (e.g., due to different Doppler shifts associated with each path). Doppler spread may be a measure of a difference in frequencies of signals on the paths associated with the multipath propagation channel. Doppler spread may sometimes be referred to as a channel time correlation or a channel time coherency characteristic for a multipath propagation channel.

An uplink DMRS may be used to estimate parameters associated with an uplink communications channel between a base station 110 and a UE 120. Because different configurations of the uplink DMRS may be better suited for different channel and SNR conditions, a base station 110 may dynamically select an uplink DMRS configuration for use based on one or more channel parameters that reflect the conditions of the uplink channel between the base station 110 and the UE 120. For example, the base station 110 may select an uplink DMRS configuration for an uplink channel based on the delay spread, SNR, and/or a Doppler parameter (e.g., Doppler spread) associated with the uplink channel, among other examples. For example, the base station 110 may use an estimated uplink Doppler spread to select a DMRS configuration for a UE 120, as described in more detail below.

Additionally, or alternatively, in high mobility environments (e.g., environments in which the UE 120 is traveling at high rates of speed, such as 500 kilometers per hour (km/h) or similar speeds), accurate Doppler parameter (e.g. Doppler shift) estimation may be needed for efficient Doppler pre-compensation, such as in a case of a multi TRP transmission to a UE in downlink. For example, in an HST scenario (e.g., where the UE 120 is mounted on a train or is location inside of a train), the base station 110 may pre-compensate for a Doppler shift experienced due to the high rate of speed (e.g., the base station 110 may apply Doppler shift pre-compensation for each TRP based on a Doppler shift reported, indicated to, or measured by the base station 110). In some cases, the base station 110 may apply Doppler shift pre-compensation based on implicit reporting of the Doppler shift by a UE 120 where the UE 120 transmits reference signals (e.g., SRSs) using a frequency offset corresponding to, or defined, based on a Doppler shift measured (e.g., by the UE 120) using one or more TRSs associated with one or more TRPs involved in a downlink transmission. Therefore, in some cases, the base station 110 may determine a Doppler shift pre-compensation for multi TRP transmission in downlink based on an SRS transmission (and the corresponding Doppler shift measurements based on the SRS by different TRPs) from the UE 120.

However, Doppler parameters for the uplink channel ("uplink Doppler parameters"), such as a Doppler shift or a Doppler spread, may not be known, which may prevent the base station 110 from selecting an uplink DMRS configuration that is properly tailored to the conditions of the uplink channel or from accurately pre-compensating for the Doppler parameters experienced by a UE 120. Although the base station 110 may estimate Doppler parameters by measuring uplink reference signals from the UE 120, the estimation may be inaccurate or unreliable because the reference signals transmitted by the UE 120 may be ill-suited for Doppler parameter estimation. For example, the temporal spacing between repetitions of a reference signal may be too large, small, or inconsistent for an accurate Doppler parameter estimation given the channel characteristics, SNR, UE speed range, subcarrier spacing and carrier frequency applicable for the uplink transmissions from the UE 120.

Moreover, different Doppler parameter estimation may require different temporal spacings between repetitions of a reference signal. For example, in scenarios where Doppler shift estimation is relevant (e.g., in high mobility scenarios, such as an HST scenario) and where meaningful Doppler spread is also experienced, it may be beneficial to estimate the uplink Doppler shift based on a relatively small time gap between repetitions of a reference signal (e.g., to enable the base station 110 to decorrelate the Doppler shift estimation from the time coherency decay caused by the Doppler spread experienced). Conversely, a reliability of a Doppler spread estimation may be improved by using a time gap of multiple symbols (e.g., based on a channel profile, UE 120 speed, and/or other parameters). Therefore, in scenarios where a base station 110 is to estimate both uplink Doppler shift and uplink Doppler spread (such as an HST scenario) using an uplink reference signal (such as an SRS), different time gaps between repetitions of the uplink reference signal may be required for estimating the different Doppler parameters. Additionally, as channel parameters or deployment parameters (e.g., a subcarrier spacing used by the UE 120 or a carrier frequency used by the UE 120) change, a proper time gap for uplink Doppler parameter estimation may change. Therefore, it may be difficult to configure an uplink reference signal resource set only with two SRS resources or symbols with a fixed time gap between them to enable a base station 110 to properly estimate multiple Doppler parameters in different scenarios using the same uplink reference signal.

As indicated above, FIG. 3 is provided as an example. Other examples may differ from what is described with regard to FIG. 3.

Figure 4:
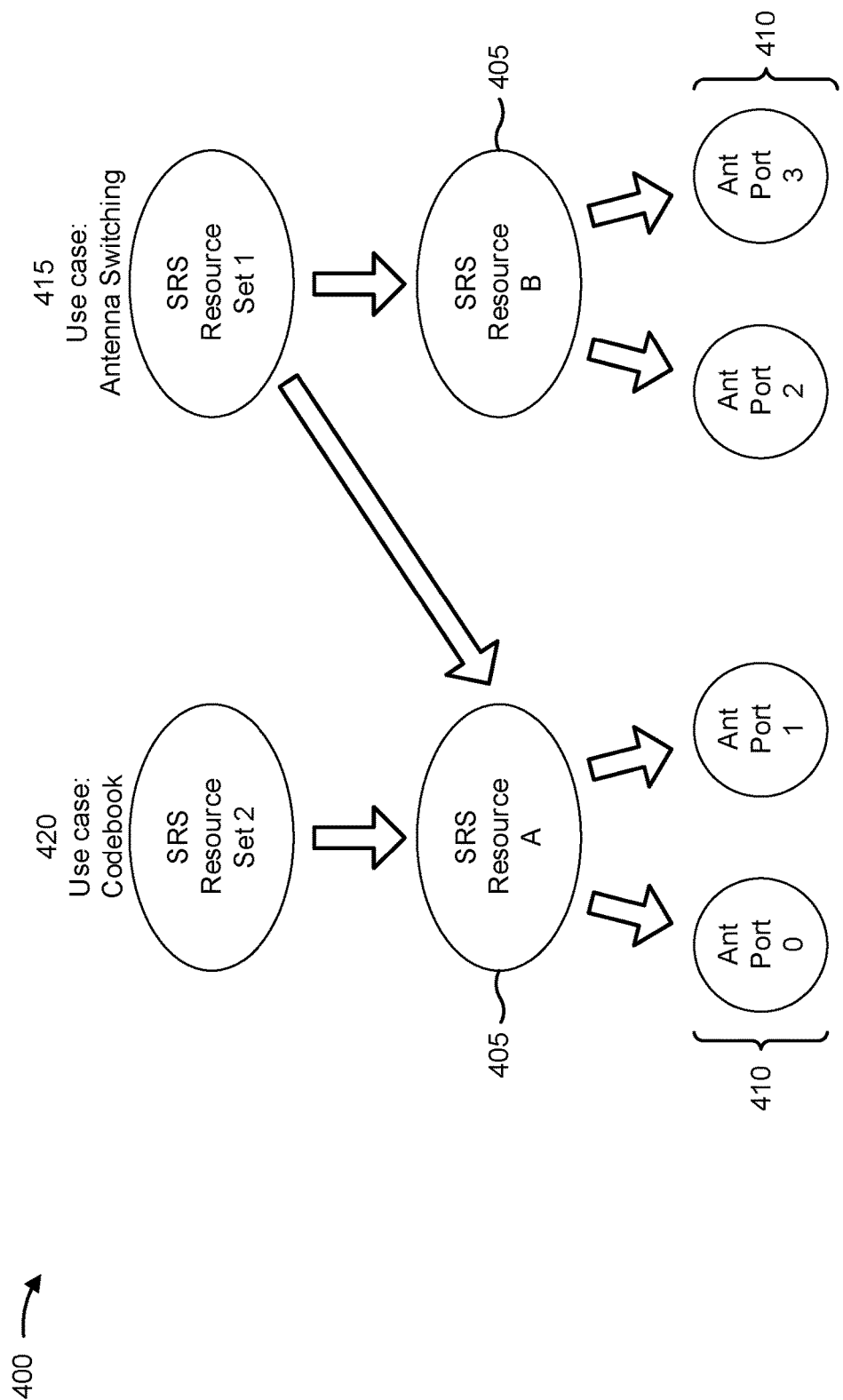
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element or an SRS-ResourceSet information element) for the SRS resource set. For example, an SRS resource set may have a usage type of antenna switching, codebook, non-codebook, beam management, and/or positioning.

An antenna switching SRS resource set may be used to measure downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be implicitly indicated to the base station 110 through different hypotheses of the precoded uplink layers transmitted over the non-codebook based SRS ports). A beam management SRS resource set may be used to assist in UL beam management decisions for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different usage configuration) may overlap (e.g., in time and/or in frequency, such as in the same slot). For example, as shown by reference number 415, a first SRS resource set (e.g., shown as SRS Resource Set 1) is shown as having an antenna switching usage or type. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some examples, the wireless device may be a base station 110 that dynamically selects an uplink DMRS configuration that increases spectral efficiency of the link because the selected uplink DMRS configuration may be the most suited to the current channel conditions. For example, the base station 110 may use the parameters of one or more uplink reference signals (e.g., a DMRS or an SRS) and a set of channel characteristics (e.g., Doppler spread, delay spread, and/or SNR) to estimate multiple link quality characteristics (e.g., multiple signal-to-interference-plus-noise rations (SINRs)) that correspond to multiple uplink DMRS configurations. The base station 110 may then use the estimated signal quality characteristics to identify an uplink DMRS configuration of the multiple uplink DMRS configurations for subsequent communications (e.g., based on determining that an estimated spectral efficiency of the link associated with the uplink DMRS configuration is higher than an estimated spectral efficiency associated with the other uplink DMRS configurations).

However, a base station 110 may not be able to reliably determine the Doppler spread for the uplink channel, which may prevent the base station 110 from properly selecting a proper DMRS configuration (e.g., because the post processing SINR values or the corresponding spectral efficiency estimates used to select the DMRS configuration are a function of the channel estimation error variance, which in turn can be modeled as a function of the Doppler spread among the other parameters). In one example, the base station 110 may estimate the uplink Doppler spread by measuring repetitions of existing uplink reference signals (e.g., DMRS, SRS) from a UE 120. For example, the base station 110 may measure one or more SRSs associated with a use case of antenna switching, codebook, non-codebook, or beam management. However, repetitions of these reference signals (e.g., the existing SRS configurations) may be improperly spaced for Doppler spread estimation, which may result in an inaccurate Doppler spread estimation that negatively impacts the selection of an uplink DMRS configuration by the base station 110. Moreover, configuring an SRS to have multiple time gap options may introduce a large overhead (e.g., and consume UE resources) as a high number of SRS resources may need to be configured to provide multiple time gap options.

Additionally, or alternatively, in some cases, a base station 110 may compensate for a Doppler shift experienced by a UE 120 on signals transmitted by multiple TRPs simultaneously on the same resources in high mobility environments based on estimating the uplink Doppler shift using an SRS transmitted by the UE 120 (e.g., an implicit Doppler shift signaling or indication). A Doppler shift estimation using two repetitions of an SRS with a temporal spacing assumes that the two repetitions experience approximately the same channel (e.g., that the channels experienced by the two repetitions have a time correlation of approximately 1). Therefore, a temporal spacing (e.g., a time gap) between repetitions of an SRS used to estimated uplink Doppler shift may be based on a channel type (e.g., because the channel type may impact time correlation behavior), a Doppler spread (or time coherence) associated with the channel, a speed of the UE 120, and/or a possibility of Doppler shift aliasing or phase ambiguity in time, SNR among other examples (as described in more detail below). However, repetitions of SRSs (e.g., the existing SRS configurations) may be improperly spaced for Doppler shift estimation, which may result in an inaccurate Doppler shift estimation that negatively impacts the pre-compensation of the Doppler shift in downlink by the base station 110 based on Doppler shift estimations associated with the channel of each TRP.

As indicated above, FIG. 4 is provided as an example. Other examples may differ from what is described with regard to FIG. 4.

Figure 5A:
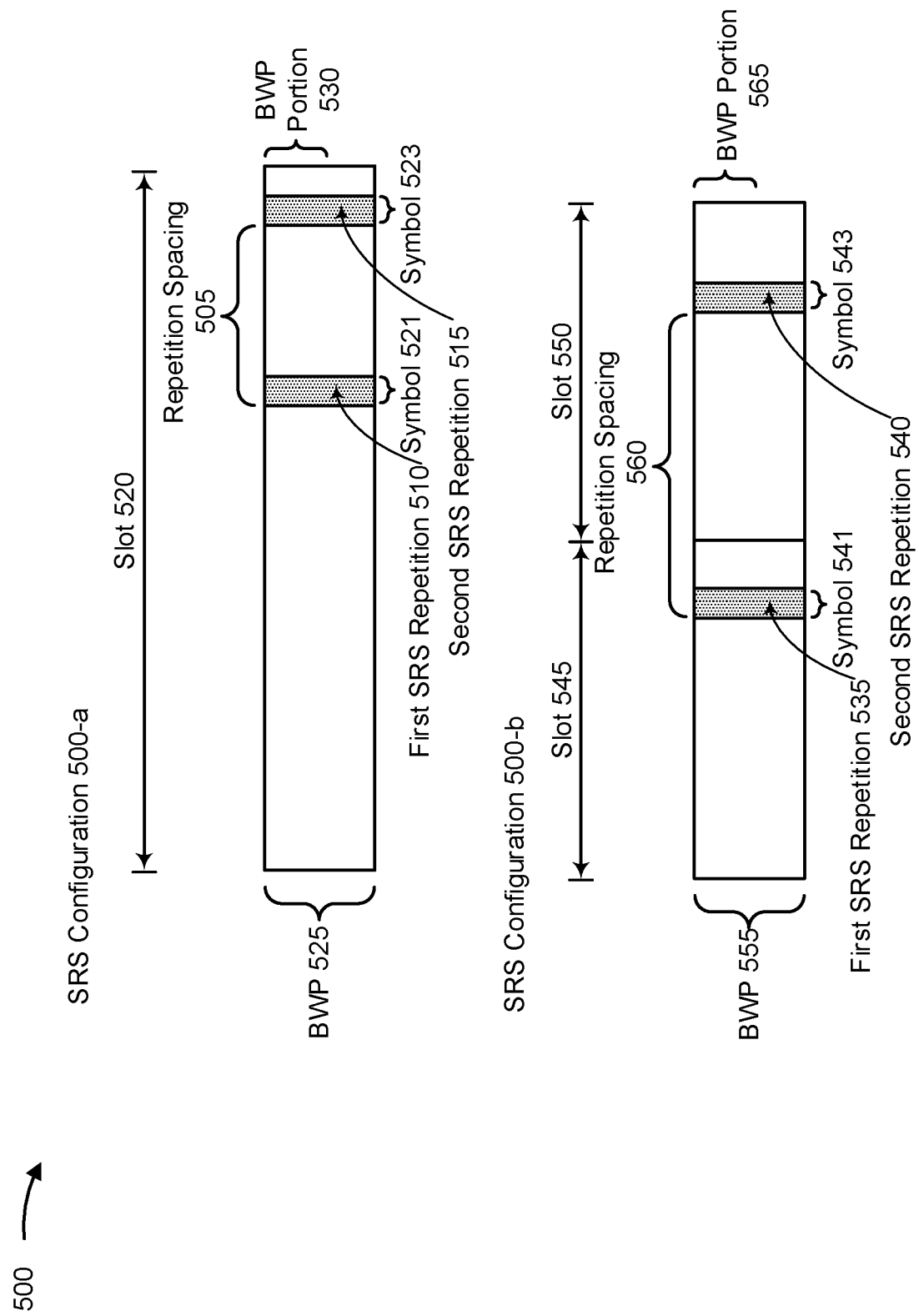

FIGS. 5A and 5B are diagrams illustrating an example 500 of uplink Doppler parameter estimation considerations, in accordance with the present disclosure. FIG. 5A depicts examples of SRS configurations that may support DMRS configuration selection. The SRS configurations may include SRS configuration 500-*a* and SRS configuration 500-*b*, which may be examples of SRS configurations implemented in a wireless communications system, such as the wireless network 100. For example, the SRS configurations may represent SRS configurations that are selected by a base station 110 for use by a UE 120.

As described above, a base station 110 may use uplink Doppler parameters, among other factors, as a basis for selecting an appropriate uplink DMRS configuration that allows an increase in the spectral efficiency of the link. In some examples, the base station may determine the Doppler spread for an uplink channel based on the correlation in time between two repetitions of an uplink reference signal. The correlation in time (also referred to as "correlation" or a "time correlation parameter") between two repetitions of a reference signal may be determined by measuring corresponding aspects of two repetitions of a reference signal.

"Repetitions of a reference signal" may refer to repeated transmissions of the same reference signal. In some examples (e.g., when referring to an SRS), repetitions of a reference signal may be referred to herein as pilots or pilot signals, and the resources used to carry the pilot signals (or reserved for carrying the pilot signals) may be referred to as pilot resources or pilot symbols. The temporal spacing between reference signal repetitions may be referred to herein as repetition spacing, pilot spacing (e.g., for SRS), and/or a reference signal spacing configuration, among other examples.

To increase the accuracy of a Doppler spread estimation, a base station 110 may average the correlations of multiple pairs of reference signals that share a common repetition spacing. However, such a technique may be ineffective if the repetition spacing between pairs of reference signals is inconsistent. The suitability of repetition spacing for Doppler spread estimation may vary with the communication parameters used by the UE 120. For example, the repetition spacing that is suitable for Doppler spread estimation may vary with the channel type/characteristics (e.g. LOS, non-LOS, directional channel, SFN channel, Rayleigh, and/or Rician), UE speeds range, subcarrier spacing and carrier frequency used by the UE 120 to transmit the reference signal. The subcarrier spacing and carrier frequency used by a UE 120 may be configured for the UE 120 by the network based on capabilities of the UE 120. A repetition spacing may be considered suitable for Doppler spread estimation if the resulting correlation (e.g., channel time correlation) between reference signal repetitions is within an acceptable threshold range (e.g., a time correlation parameter may need to be maintained between 0.4 and 1, to enable the resulting Doppler spread estimation to be done reliably). Table 1 provides an example of suitable repetition spacing for a reference signal, given certain non-limiting pairings of subcarrier spacing and carrier frequency and with a Rayleigh channel type assumption. "Subcarrier spacing" may refer to the frequency gap between subcarriers used for communications between a base station and a UE 120. "Carrier frequency" may refer to a frequency band used for communications between a base station 110 and a UE 120.

TABLE 1

| Pilot Spacing | Subcarrier Spacing | Carrier Frequency |
| --- | --- | --- |
| 3-4 OFDM symbols | 15 kHz | 6 GHz |
| 6-7 OFDM symbols | 30 kHz | 6 GHz |
| 12-13 OFDM symbols | 60 kHz | 6 GHz |

In some examples, a base station 110 may estimate the uplink Doppler spread for a channel by measuring a DMRS or an SRS. For example, the base station 110 may measure two DMRS repetitions or symbols to determine the uplink Doppler spread, or the base station 110 may measure two SRS repetitions to determine the uplink Doppler spread. However, Doppler spread estimation using a DMRS may be inaccurate because the spacing between DMRS repetitions varies with PUSCH allocations, DMRS bandwidth depends on a PUSCH allocation bandwidth, DMRS availability depends on PUSCH scheduling and hence may result in unreliable or inconsistent correlation values. Additionally, or alternatively, there may be only one DMRS symbol in a PUSCH allocation, which prevents correlation altogether. Moreover, the suitability of SRS for accurate Doppler spread estimation may be limited to certain communication scenarios (e.g., limited to a subset of possible subcarrier spacing, carrier frequency, channel type and UE speed range combinations) because the network may only support a limited quantity of SRS repetition spacing options. As a result, to configure multiple time gaps between SRS resources or SRS symbols may require a high SRS overhead (e.g., may require a high number of SRS resources to be configured for the UE 120).

For example, an SRS configuration supported by the network may include four SRS repetitions transmitted consecutively (e.g., transmitted in consecutive SRS symbols). Thus, the maximum spacing between SRS repetitions may be three symbols, which means the SRS configuration may be suitable for reliable Doppler spread estimation (e.g., in the case of a Rayleigh channel assumption) when the UE 120 uses a subcarrier spacing of 15 kHz and a carrier frequency of 6 GHz, but not when the UE 120 uses other combinations of subcarrier spacing and carrier frequency. As another example, an SRS configuration supported by a base station 110 and a UE 120 may include two SRS repetitions transmitted in the last symbol of the first slot or subframe and in the first valid SRS location of the next slot or subframe (e.g., two consecutive uplink slots or subframes). Thus, the minimum spacing between SRS repetitions may be nine symbols (assuming a fourteen-symbol slot), which means that this SRS configuration may be unsuitable for reliable Doppler spread estimation (e.g., in the case of Rayleigh channel assumption) when the UE 120 uses any combination of subcarrier spacing and carrier frequency in Table 1.

Therefore, in some cases, a base station 110 may further improve the accuracy of a Doppler spread estimation (e.g., to improve the DMRS configuration selection). In such scenarios, the base station 110 may estimate the uplink Doppler spread by using an SRS configuration with a repetition spacing that suits the subcarrier spacing and carrier frequency used by the UE 120. For example, the base station 110 may instruct a UE 120 to use SRS configuration 500-$a$ or SRS configuration 500-$b$, which may define (or be associated with) a repetition spacing (e.g., repetition spacing 505 or repetition spacing 560, respectively) that is suited to a particular combination of subcarrier spacing and carrier frequency and for a specific channel characteristics or channel type experienced by the link. The base station 110 may configure the SRS for the Doppler spread estimation instead of the DMRS because the timing of SRS repetitions is independent of PUSCH scheduling and thus more flexible. In some examples, each SRS repetition may occupy a set of resource elements-in a symbol, and the resource elements for different repetitions may span the same frequency band. SRS configuration 500-$a$ may depict an example of intra-slot SRS repetitions (e.g., where multiple SRS resources are included in the same slot) and SRS configuration 500-$b$ may depict an example of inter-slot SRS repetitions (e.g., where SRS resources are included in different slots).

SRS configuration 500-$a$ may define (or be associated with) a repetition spacing 505 that is the temporal spacing between SRS repetition symbols (e.g., symbols used for repetitions of the SRS). Thus, the repetition spacing 505 may be in the time domain and may be measured in time (e.g., milliseconds) or quantity of symbols (e.g., the time correlation may be measured in terms of OFDM symbols post fast Fourier transform (FFT)). The repetition spacing 505 may be between a first repetition of the SRS (e.g., in a first symbol) and a second repetition of the SRS (e.g., in a second symbol). For example, the repetition spacing 505 may separate the first SRS repetition 510 and the second SRS repetition 515, which may be transmitted in symbol 521 and symbol 523, respectively. The repetitions of the SRS may be in the same slot, which may be a slot 520 (e.g., a subframe). In some examples, the SRS repetitions may span the entire bandwidth part 525 configured for the UE 120. In other examples, the SRS repetitions may span a portion (e.g., bandwidth part (BWP) portion 530) of the bandwidth part configured for the UE (e.g., so that SRS repetitions from other UEs can be multiplexed in the same subframe). In such examples, the base station 110 may change the portion of the bandwidth part allocated to the SRS repetitions (e.g., based on channel information from a link adaption procedure).

SRS configuration 500-b may also define (or be associated with) a repetition spacing 560, which may be for SRS repetitions in different subframes or slots (e.g., consecutive subframes). For example, the repetition spacing 560 may be between a first repetition of the SRS (e.g., first SRS repetition 535) in a first resource (e.g., slot 545) and a second repetition of the SRS (e.g., second SRS repetition 540) in a second resource (e.g., slot 550). The first SRS repetition 535 may be transmitted in a first symbol location (e.g., symbol 541) in slot 545 and the second SRS repetition 540 may be transmitted in a second symbol location (e.g., symbol 543) in slot 550. In some examples, the SRS repetitions may span the bandwidth part 555 configured for the UE 120. In other examples, the SRS repetitions may span a portion (e.g., BWP portion 565) of the bandwidth part configured for the UE 120 (e.g., so that SRS repetitions from other UEs can be multiplexed in the same subframes or slots). In such examples, the base station 110 may change the portion of the bandwidth part allocated to the SRS repetitions (e.g., based on channel information from a link adaption procedure).

However, as described above, a temporal spacing (e.g., a time gap) between repetitions of an SRS used to accurately and reliably estimate Doppler spread may be different than a temporal spacing needed to accurately and reliably estimate a Doppler shift. For example, the base station 110 may estimate or measure a phase difference ($\Delta\theta$) related to the Doppler shift between repetitions of an SRS. For example, $\Delta\theta=2\pi \times f_{Doppler\ shift} \times \Delta T$, where $f_{Doppler\ shift}$ is the frequency offset associated with the Doppler shift and $\Delta T$ is the temporal offset (or time gap) between the repetitions of the SRS. The Doppler shift estimation by the base station 110 may assume that the two repetitions experience approximately the same channel. In other words, the equation $\Delta\theta=2\pi \times f_{Doppler\ shift} \times \Delta T$ may assume that the time correlation of the channel between the repetitions of the SRS is equal to 1 (e.g., may assume that the channel experienced by the first repetition and the channel experienced by the second repetition are fully correlated in time). This assumption may hold true when the channel is not experiencing fading, such as where a directional channel with a dominant path of the signal (for example associated with a direct LOS between the transmitter and the receiver) or in any other case where there is no significant multipath (e.g. a LOS channel), because time coherency may be preserved for the channel between the two repetitions of the SRS for these channel scenarios. In such examples, it may be beneficial to use a larger time gap between the repetitions in order to minimize a Doppler shift estimation error. For example, this can be concluded by observing an estimation error variance bound (e.g., a Cramer-Rao lower bound (CRLB) expression for frequency offset estimation) that may be improved if a larger time gap between the repetitions is used, such that a larger time gap may allow for a lower estimation error variance bound.

However, if the channel is a non-LOS channel, or if the channel is experiencing fading, then the time coherency of the channel may be limited over time (e.g., a time coherency may only be maintained for the channel for a short period of time). For example, if the channel is a multipath channel, the channel may experience a Doppler spread, which may result in a time coherence of the channel not being maintained between repetitions of an SRS. Therefore, to ensure that time coherence between the repetitions is maintained, a small time gap may be needed between the repetitions to accurately and reliably estimate Doppler shift (e.g., to ensure that a Doppler spread of the channel does not impact the estimation of the Doppler shift).

A maximum time gap that can be used between the repetitions for Doppler shift estimation may be limited by a phase ambiguity or Doppler shift aliasing. For example, phase ambiguity or Doppler shift aliasing may require that $$|\Delta\theta = 2\pi \times f_{Doppler\ shift} \times \Delta T| < \pi,$$

such that $$f_{Doppler\ shift} < \frac{1}{2\Delta T}$$

to ensure that the phase difference is maintained on a single cycle of the phase (e.g., if the phase difference ($\Delta\theta$) is greater than $\pi$, the cycle of phase with which the phase difference is associated may be unclear). Example permissible pilot spacings (e.g., time gaps between repetitions of an SRS) in accordance with the phase ambiguity or Doppler shift aliasing are shown below in Table 2. The examples shown in Table 2 assume an LOS channel, a subcarrier spacing of 30 kHz, and a carrier frequency of 4.5 GHz.

TABLE 2

| UE Speed | Doppler Shift | Permissible Pilot Spacing |
|---|---|---|
| 500 km/h | 2083 Hz | 6 OFDM symbols |
| 300 km/h | 1250 Hz | 11 OFDM symbols |
| 200 km/h | 833 Hz | 16 OFDM symbols |

As shown in Table 2, as a speed of the UE 120 increases, the Doppler shift experienced by the UE 120 may also increase. As a result, as the UE 120 speed increases, permissible pilot spacings (e.g., maximum time gaps between repetitions of an SRS) may decrease, to mitigate phase ambiguity or Doppler shift aliasing. For example, at a UE 120 speed of 500 km/h, a permissible pilot spacing may be limited to 6 OFDM symbols, whereas at a UE 120 speed of 200 km/h, a permissible pilot spacing may be limited to 16 OFDM symbols. Correspondingly, time gap selection for Doppler shift estimation may be done adaptively per scenario in order to achieve an improved estimation accuracy and reliability. For example, at lower UE 120 speeds, a larger time gap between repetitions of an SRS may be used for improved accuracy of Doppler shift estimation by a base station 110. Therefore, in high mobility scenarios, such as an HST scenario, a configuration of the SRS resource set may need to take a speed of the UE 120 into account to ensure that the Doppler shift estimation mitigates a risk of phase ambiguity or Doppler shift aliasing.

As described above, a time gap (or pilot spacing) for Doppler spread estimation may be selected to ensure that a time correlation parameter for the channel is maintained between 0.4 and 1 to enable the resulting Doppler spread estimation to be done reliably. The time correlation parameter may be based at least in part on a channel type, channel parameters, a UE 120 speed, and/or deployment parameters (e.g., subcarrier spacing and/or carrier frequency), among other examples. For example, for a Rayleigh channel type, to ensure that the time correlation parameter is maintained between 0.4 and 1, it may be beneficial to use a different time gap (e.g., a different pilot spacing) for different deployment parameters (e.g., as indicated in Table 1). In some cases, a deployment may assume a certain channel type. For example, an HST SFN deployment may assume a clustered delay line (CDL) channel type with a dominant LOS path that is assumed as a typical case for each TRP (e.g., as the HST SFN may assume a train mounted UE 120, rather than other possible scenarios). However, an uplink channel experienced in the HST SFN deployment may be similar to a Rician channel type or channel model (e.g., that assumes that a dominant signal may be a phasor sum of two or more dominant signals). Additionally, a UE 120 that is located inside of a train in an HST SFN deployment may experience an uplink channel that may be similar to a Rayleigh channel type or channel model (e.g., that assumes there is no dominant LOS path). In some examples, a Rayleigh channel type or channel mode may be a case of a Rician channel when there is no LOS signal. Therefore, a specific fixed time gap (or pilot spacing) for Doppler spread estimation may be not appropriate for all the scenarios or may be limiting and may need to be selected adaptively per scenario to ensure accurate Doppler spread estimation (e.g., to enable uplink DMRS selection or to be used for other uplink configuration or demodulation/processing aspects).

As a result, to accurately measure or estimate both Doppler shift and Doppler spread, two different time gaps (e.g., two different pilot spacings) may be needed. Moreover, to accurately estimate Doppler spread, a Doppler shift estimation may need to be performed first by a base station 110 (e.g., to remove a frequency offset associated with the common Doppler shift when estimating the Doppler spread). Therefore, two different measurements may be needed by the base station 110 to estimate both Doppler shift and Doppler spread. Additionally, the most convenient time gap selection for Doppler shift or Doppler spread estimation should be done adaptively per scenario depending on the channel type, SNR, deployment parameters and UE speed range.

For example, as shown in FIG. 5B, an example 570 depicts different scenarios and corresponding different time gaps (e.g., for different Doppler parameter estimations). For example, the table depicted in FIG. 5B shows examples of different possible configurations in different scenarios to optimize uplink Doppler spread and uplink Doppler shift estimations by a base station 110. For example, in an HST scenario where the UE 120 is a train mounted UE (e.g., is mounted or deployed in a fixed position on the outside of a train), a channel type may be associated with a slow channel time correlation decay per TRP (for each TRP). In other words, a time correlation for the channel may be maintained over a longer period of time (e.g., as the UE 120 may be associated with additional antennas and may have an improved LOS to a TRP). Therefore, a time gap for an uplink Doppler shift estimation may be configured to be up to 6 OFDM symbols (e.g., assuming a UE 120 speed of 500 km/h; other possible time gaps for other UE 120 speeds are shown in Table 2). A time gap for an uplink Doppler spread estimation may be configured to be multiple OFDM symbols to ensure improved time correlation resolution for different UE 120 speeds. In an HST scenario where the UE 120 is located inside the train (e.g., is not a train mounted UE), a channel type may be a non-LOS channel (e.g., the UE may not have a direct line of sight to a TRP) and may be associated with a fast channel time correlation decay per TRP (for each TRP). In other words, a time correlation for the channel may not be maintained over longer periods of time, such as over multiple symbols or a slot. Therefore, a time gap for an uplink Doppler shift estimation may be configured to be 1 or 2 OFDM symbols to ensure that a time correlation between the repetitions of the SRS is maintained.

Additionally, a time gap for an uplink Doppler spread estimation may be configured to be approximately half a slot (e.g., assuming a Rayleigh channel type) to ensure improved time correlation resolution for different UE 120 speeds (e.g., examples of time gaps for different deployment scenarios are shown above in Table 1). In a scenario in which the UE 120 is a mobile UE with a single TRP transmission (e.g., and not in case of a special HST SFN deployment with TRPs densely distributed along the railway track). For example, a mobile UE may be moving on highway and experiencing a fading non-LOS channel with an FR1 deployment, and/or may be experiencing a channel type associated with a fast channel time correlation decay. In other words, a time correlation for the channel may not be maintained over longer periods of time, such as over multiple symbols or a slot. Therefore, a time gap for an uplink Doppler shift estimation may be configured to be 1 or 2 OFDM symbols to ensure that a time correlation between the repetitions of the SRS is maintained. Additionally, a time gap for an uplink Doppler spread estimation may be configured to be approximately half a slot (e.g., with a Rayleigh channel type assumption) to ensure improved time correlation resolution for different UE 120 speeds (examples of time gaps for different deployment scenarios are shown above in Table 1).

As a result, different channel types, different channel parameters, SNR conditions, different UE 120 speeds, and/or different deployment parameters may be associated with different optimal time gaps for uplink Doppler parameter estimation. For example, a different time gap between repetitions of an SRS may be configured, depending on a Doppler parameter to be measured, a channel type, one or more channel parameters, a speed of the UE 120, and/or one or more deployment parameters. However, current SRS configurations may be limited in a permissible repetition spacing and/or a number of SRS resources or symbols that can be configured in each slot in order to allow adaptive SRS repetitions spacing for different channel, UE characteristics and deployment scenario combinations and also for different Doppler parameters estimation with a high level of accuracy and robustness. Moreover, a base station 110 may be unable to configure SRS resource sets that include SRS resources that have different temporal spacings. Therefore, current SRS configurations may be unable to provide a required flexibility needed to enable a base station 110 to perform different uplink Doppler parameter estimations in a robust and accurate way. For example, to enable different Doppler parameter estimations (e.g., that are associated with different time gaps or pilot spacings), a base station 110 may need to configure a first SRS resource set for a first Doppler parameter estimation and a second SRS resource set for a second Doppler parameter estimation. However, even with the two SRS resource sets, it may not be possible for each of the SRS resource sets to be configured with an optimal time gap for Doppler parameter estimation. Moreover, this increases overhead associated with transmitting SRSs and performing the Doppler parameter estimations, because additional SRSs will need to be transmitted by the UE 120 (e.g., using the different SRS resource set configurations, such as transmitting 4 SRS symbols).

Some techniques and apparatuses described herein enable configurations for Doppler tracking SRS resource sets. "Doppler tracking SRS" may refer to an SRS that can be used by a base station 110 to measure or estimate uplink Doppler spread and/or uplink Doppler shift or uplink frequency offset. For example, an additional SRS usage type may be defined, associated with a Doppler tracking SRS. In some aspects, a base station 110 may be enabled to configure one or more SRS resources (e.g., using one or more SRS resource identifiers) associated with the Doppler tracking SRS resource set. The configured SRS resources may be associated with similar (or the same) configurations other than intra-slot starting location for each SRS resource. In other words, the base station 110 may be enabled to configure different starting symbol locations for different SRS resources (e.g., included in the SRS resource set) within the same slot. The SRS resource set, and the associated SRS resources, may be a periodic SRS, a semi-persistent SRS, or an aperiodic SRS.

Additionally, some techniques and apparatuses described herein enable dynamic reconfigurations for Doppler tracking SRS resource sets. For example, a base station 110 may be enabled to dynamically reconfigure a starting symbol location for different SRS resources (e.g., included in the SRS resource set) within a single slot (e.g., to dynamically adjust a time gap between the different SRS resources). Additionally, or alternatively, the base station 110 may be enabled to dynamically activate or deactivate an SRS resource (e.g., included in the SRS resource set) to conserve overhead if the SRS resource is not needed for uplink Doppler parameter estimation. For example, in some scenarios, multiple Doppler parameter estimations may be performed using 3 SRS resources or SRS symbols. In some other scenarios, only a single Doppler parameter may need to be estimated. Therefore, the base station may dynamically deactivate an SRS resource to conserve overhead that would otherwise be used to transmit the SRS resource when the SRS resource is not needed for Doppler parameter estimation. As a result, dynamically activating or deactivating an SRS resource may provide additional flexibility to configure SRS resource based at least in part on a measurement type (e.g., Doppler parameter(s) to be estimated or measured) and/or scenario.

As a result, a flexible configuration for Doppler tracking SRS resource sets may be provided to enable a base station 110 to dynamically ("on the fly") reconfigure an SRS resource set based at least in part on Doppler parameter(s) to be measured, a channel type, one or more channel parameters, a speed of the UE 120, SNR and/or one or more deployment parameters, among other examples. This may improve an accuracy of Doppler parameter estimations and reduce an SRS overhead by enabling the base station 110 to configure different time gaps or pilot spacings between SRS resources (e.g., for different Doppler parameter estimations) within the same SRS resource set. Additionally, the base station 110 may be enabled to dynamically (re)configure different numbers of SRS resources or SRS symbols that may be required to support a different estimations at different time periods. Additionally, the base station 110 may be enabled to dynamically reconfigure the SRS resource set based at least in part on changing channel conditions, changing UE 120 speed, SNR and/or changing deployment parameters, among other examples. Additionally, an overhead associated with transmitting the SRSs for Doppler tracking purposes may be reduced. Moreover, the configurations described herein may provide additional scheduling flexibility for a base station 110 to enable the base station 110 to schedule other uplink transmissions in a same slot (e.g., for the UE 120 transmitting the SRS and/or for other UEs 120).

Figure 6:
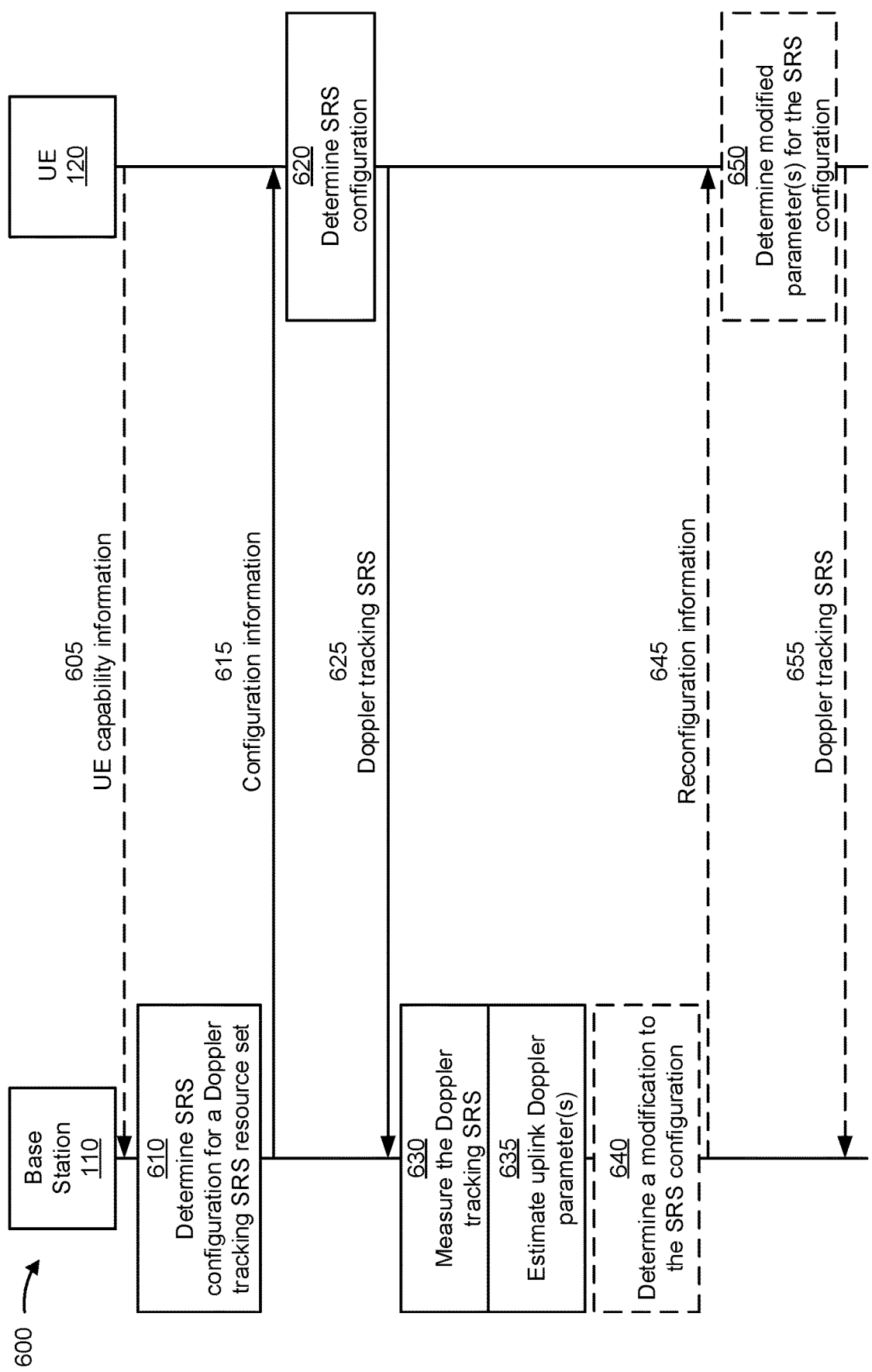
FIG. 6 is a diagram illustrating an example associated with configurations and dynamic signaling for Doppler tracking SRS resource sets, in accordance with the present disclosure.

FIG. 6 is a diagram illustrating an example 600 associated with configurations and dynamic signaling for Doppler tracking SRS resource sets, in accordance with the present disclosure. As shown in FIG. 6, a base station 110 and a UE 120 may communicate with one another in a wireless network, such as the wireless network 100.

Example 600 may be associated with configurations for Doppler tracking SRS resource sets that are to be used by the base station 110 to measure and/or estimate uplink Doppler parameters. For example, a Doppler tracking SRS resource set may be used by a base station 110 to estimate an uplink Doppler shift and/or an uplink Doppler spread. As described in more detail elsewhere herein, the SRS resource set may include multiple SRS resources (e.g., within a single slot) that have a temporal spacing between the SRS resources (e.g., the multiple SRS resources within the single slot may be non-contiguous). In other words, the multiple SRS resources may be associated with non-consecutive OFDM symbols within a single slot. To enable accurate Doppler parameter estimations, the UE 120 should transmit the multiple SRS resources using the same (or approximately the same) phase. However, in some cases, a UE 120 may not be capable of maintaining a phase coherence or a phase continuity between transmissions of the multiple SRS resources. Therefore, the configurations described herein may be based at least in part on a capability of the UE 120 (e.g., the capability to support one or more SRS configurations as described herein, the capability to support a repetitive pattern of an SRS signal with a particular spacing between repetitions and phase coherency between the repetitions), the type of UE 120, and/or the mobility status of the UE 120, among other factors and deployment parameters (such as a subcarrier spacing or carrier frequency).

For example, as shown by reference number 605, the UE 120 may transmit, and the base station 110 may receive, capability information indicating one or more capabilities of the UE 120. For example, the UE 120 may transmit an indication of whether the UE 120 is capable of supporting an SRS usage type associated with Doppler tracking (e.g., indicating whether the UE 120 is capable of supporting one or more configurations described herein). In some aspects, the UE 120 may transmit an indication of a capability of the UE 120 indicating whether the UE 120 can maintain phase coherency between different transmissions of non-consecutive SRS resources (referred to herein as a "phase coherency capability"). For example, the phase coherency capability may indicate a capability of the UE 120 to maintain intra slot phase coherency between SRS symbols associated with an SRS resource set. Although examples of the phase coherency capability of the UE 120 are described in connection with a Doppler tracking SRS resource set, a similar capability may be indicated by the UE 120 for other scenarios where phase coherence should be maintained between transmission in non-consecutive symbols. In some aspects, the UE 120 may transmit an indication of whether the UE 120 is capable of maintaining phase coherence between two non-consecutive symbols associated with a Doppler tracking SRS when a downlink communication is received during a symbol between the two non-consecutive symbols.

In some aspects, the UE 120 may transmit an indication of whether the UE is capable of maintaining phase coherence between two non-consecutive symbols associated with a Doppler tracking SRS when another uplink communication is transmitted by the UE 120 during a symbol between the two non-consecutive symbols. In some aspects, the UE 120 may transmit an indication of whether the UE 120 is capable of maintaining phase coherence between two non-consecutive symbols associated with the Doppler tracking SRS when the uplink communication is associated with a different transmit power level than a transmit power level associated with the Doppler tracking SRS. In some aspects, the UE 120 may transmit an indication of whether the UE 120 is capable of maintaining phase coherence between two non-consecutive symbols associated with the Doppler tracking SRS when the uplink communication is associated with a different carrier frequency than a carrier frequency associated with the Doppler tracking SRS.

In some aspects, the UE 120 may transmit an indication that the UE 120 is capable of maintaining phase coherence between two non-consecutive symbols associated with a Doppler tracking SRS only when no communications are transmitted or received by the UE 120 between the two non-consecutive symbols. In such examples, the UE 120 may transmit an indication of a permissible time gap between the two non-consecutive symbols. The permissible time gap may indicate a largest time gap that can be configured between SRS resources for the UE 120 when the UE 120 cannot (or is not configured to) transmit or receive any communications in the same frequency band or same frequency band combination (e.g., in one or more frequency band groups) during the time gap.

As shown by reference number 610, the base station 110 may determine an SRS configuration for a Doppler tracking SRS resource set. In some aspects, the base station 110 may determine the SRS configuration based at least in part on a capability of the UE 120 (e.g., a phase coherency capability or a capability to support Doppler tracking SRS resource sets). In some aspects, the base station 110 may determine the SRS configuration based at least in part on a carrier frequency, a subcarrier spacing, a type of deployment, a channel condition, a channel type, and/or movement information associated with the UE 120, among other examples. In some aspects, the base station 110 may determine the SRS configuration based at least in part on one or more uplink Doppler parameters to be estimated by the base station 110. For example, the base station 110 may determine a configuration for one or more SRS resources (or SRS resource identifiers) associated with the SRS resource set.

For example, the base station 110 may select or determine an SRS configuration to be associated with SRS resources with optimized time gaps (or pilot spacings) for one or more uplink Doppler parameter estimations. As described in more detail elsewhere herein, an optimized time gap (or pilot spacing) for an uplink Doppler parameter estimation may be based at least in part on the Doppler parameter to be estimated, a carrier frequency, a subcarrier spacing, a channel condition, a channel type, and/or movement information associated with the UE 120, among other examples. For example, in scenarios in which the base station 110 is to estimate both uplink Doppler shift and uplink Doppler spread, the base station 110 may select or determine an SRS configuration to include SRS resources with a first time gap (or pilot spacing) for an uplink Doppler shift estimation and a second time gap (or pilot spacing) for an uplink Doppler spread estimation. For example, within a slot, the base station 110 may determine starting symbol locations (e.g., intra-slot starting locations) for different SRS resources included in the SRS resource set. "Intra-slot start position" may refer to a starting OFDM symbol location within a slot where an SRS corresponding to the SRS resource identifier is to be transmitted by the UE 120. The base station 110 may determine the starting symbol locations for the different SRS resources to optimize one or more time gaps for different uplink Doppler parameter estimations. In this way, the base station 110 may be enabled to select or determine an SRS configuration that is optimized for multiple Doppler parameter estimations (e.g., that includes different time gaps between different SRS resources to enable base station 110 to perform multiple Doppler parameter measurements and/or estimations using the same SRS resource set).

As shown by reference number 615, the base station 110 may transmit, and the UE 120 may receive, configuration information for an SRS resource set. For example, the base station 110 may transmit the configuration information using an RRC message (e.g., the configuration for the SRS resource set may be an RRC configuration). In some aspects, the configuration information may partially be indicated by another message. For example, for an aperiodic SRS resource set (and aperiodic SRS resources included in the SRS resource set), the base station 110 may transmit DCI triggering for the aperiodic SRS resource set. Therefore, in some cases, some of the configuration information or updated configuration information may be indicated by the DCI (e.g., rather than all of the configuration information being determined based at least in part on an RRC configuration). Similarly, the configuration information may be partially indicated by a MAC-CE message (e.g., for semi-persistent SRS resources).

In some aspects, the configuration information may indicate a use type for the SRS resource set that is associated with Doppler tracking (e.g., indicating that the SRS resource set is to be used for uplink Doppler parameter estimation). For example, the configuration information may indicate the Doppler tracking usage in an SRS-SetUse information element or a usage information element. The use type for the SRS resource set may be indicated in an RRC configuration using a higher layer parameter.

In some aspects, the configuration information may indicate one or more SRS resource identifiers. For example, the configuration information may indicate one or more SRS resource identifiers in an SRS-ResourceIDList information element. In some aspects, the configuration information may indicate multiple SRS resource identifiers (e.g., for each SRS resource or symbol associated with the SRS resource set). In some other aspects, the configuration information may indicate a single SRS resource identifier that is associated with multiple SRS resources or symbols.

For example, in a first configuration type, the configuration information may indicate two or more SRS resource identifiers associated with the SRS resource set. The configuration information may indicate, for each SRS resource identifier of the two or more SRS resource identifiers, an indication of an intra-slot start position for an SRS resource associated with each SRS resource identifier of the two or more SRS identifiers. In other words, the two or more SRS resource identifiers may be configured with the same configuration, excluding the intra-slot location of the SRS resources. For example, the configuration information may indicate the intra-slot start position for each SRS resource identifier using a startPosition information element (e.g., associated with a resourceMapping information element). In the first configuration type, each SRS resource identifier may be configured as a single port transmission (e.g., using a nrofSRS-Ports information element). In some other aspects, one or more SRS resource identifiers may be configured as a multiple (e.g., two or more) port transmission. For example, for a first frequency band (e.g., an FR1 frequency band), each SRS resource identifier may be configured as a single port transmission. For a second frequency band or bands associated with a high frequency (e.g., an FR2 frequency band another band associated with a frequency range that is higher than the FR2 frequency band), one or more SRS resource identifiers may be configured as a multiple (e.g., two or more) port transmission. In the first configuration type, each SRS resource identifier may be configured as a single symbol transmission (e.g., using an nrofSymbols information element associated with a resourceMapping information element).

In a second configuration type, the configuration information may indicate one or more (e.g., N) SRS resource identifiers associated with the SRS resource set. The configuration information may indicate, for each SRS resource identifier, an indication of an intra-slot start position for an SRS resource associated with the SRS resource identifier (e.g., using a startPosition information element associated with a resourceMapping information element). In some aspects, the configuration information may indicate, for each SRS resource identifier, an indication of a number of repetitions for an SRS resource associated with the SRS resource identifier (e.g., using a repetitionFactor information element associated with the resourceMapping information element). In some aspects, the configuration information may indicate, for each SRS resource identifier, an indication of a number of symbols for an SRS resource associated with the SRS resource identifier (e.g., using a nrofSymbols information element associated with a resourceMapping information element) which may be configured consistently with the repetitionFactor information element. For example, in the SRS resource configuration, repetitions may be configured on the consecutive symbols (e.g., an SRS resource configured with 2 symbols and 2 repetitions may occupy 2 consecutive and repetitive OFDM symbols). In the second configuration type, the SRS resource identifiers may be associated with 1 or 2 symbols and 1 or 2 repetitions correspondingly (e.g., each SRS resource identifier may be configured to occupy 1 OFDM symbol or 2 OFDM symbols using the nrofSymbols information element and the corresponding repetitionFactor information element). In the second configuration type, each SRS resource identifier may be configured as a single port transmission (e.g., using the nrofSRS-Ports information element). In some other aspects, one or more SRS resource identifiers may be configured as a multiple (e.g., two or more) port transmission (e.g., for different frequency bands, in a similar manner as described above in connection with the first configuration type).

In a third configuration type, the configuration information may indicate a single SRS resource identifier associated with the SRS resource set. The SRS resource may be configured using configuration parameters for SRS resource configuration (e.g., as defined, or otherwise fixed, by a wireless communication standard, such as the 3GPP) except for the intra-slot start positions for the SRS resource. For example, rather than indicating a single value for the intra-slot start positions for the SRS resource, the configuration information may indicate multiple values for the intra-slot start positions for the SRS resource (e.g., using a startPosition information element or another information element associated with the resourceMapping information element).

For example, the configuration information may indicate multiple intra-slot start positions associated with the SRS resource identifier using a configuration field associated with the SRS resource identifier. The single configuration field may be capable of conveying multiple values (e.g., may be a multiple value indicator). The number of the multiple intra-slot start positions may (e.g., implicitly) indicate a number of symbols associated with the SRS resource identifier. The multiple intra-slot start positions may indicate intra-slot start positions relative to a last symbol of a slot. For example, if the single intra-slot start position field indicates (2, 4, 7), it may indicate that the Doppler tracking SRS is configured with 3 symbols (e.g., at symbol indices 11, 9, and 6 of a slot) with time gaps of 2 symbols (e.g., between the symbols at symbol indices 9 and 11) and 3 symbols (e.g., between the symbols at symbol indices 6 and 9). For example, in the third configuration type, a number of symbols and/or a number of repetitions may not be indicated and the UE 120 and/or the base station 110 may assume that the number of SRS symbols is implicitly defined by a length of the startPosition information element and that each SRS symbol location defined by the startPosition information element has a single repetition (e.g., the nrofSymbols information element and/or the repetitionFactor information element may not be used for the third configuration type). For example, the configuration information may not indicate information associated with a repetition factor or a number of symbols for the SRS resource identifier (e.g., to conserve signaling overhead and an RRC configuration structure volume, as this information may be implicitly indicated by the multi-valued intra-slot start position field). In the third configuration type, the SRS resource identifier may be configured as a single port transmission (e.g., using the nrofSRS-Ports information element). In some other aspects, the SRS resource identifier may be configured as a multiple (e.g., two or more) port transmission (e.g., for different frequency bands, in a similar manner as described above in connection with the first configuration type).

In a fourth configuration type, the configuration information may indicate a single SRS resource identifier associated with the SRS resource set. The SRS resource may be configured using configuration parameters for SRS resource configuration (e.g., as defined, or otherwise fixed, by a wireless communication standard, such as the 3GPP) except for the intra-slot start position for the SRS resource and an additional indication of occupied symbols for the SRS resource. For example, the additional indication of occupied symbols for the SRS resource may be a bitmap configuration indicating the occupied symbols for the SRS resource identifier (e.g., starting at the symbol location indicated by the intra-slot start position for the SRS resource). For example, non-zero elements included in the bitmap configuration may indicate occupied symbols within a slot starting based at least in part on the symbol indicated by the intra-slot start position. For example, the intra-slot start position may be defined relative to an end of a slot (e.g., relative to a last symbol in a slot). Therefore, an intra-slot start position of "4" may indicate that the starting symbol position is 4 symbols from the end of the slot (e.g., symbol 10 of a slot, assuming the slot has 14 symbols). In some aspects, the bitmap may be indicated using an information element associated with the resourceMapping information element. For example, if the intra-slot start position for the SRS resource indicates a symbol index of 6 and the bitmap indicates (1, 0, 0, 1, 0, 1), then the SRS resource may be configured with three SRS symbols (e.g., at symbol index 7, symbol index 10, and symbol index 12). Additionally, the SRS resource may be associated with a time gap of two symbols and one symbol (e.g., indicated by the elements with a value of zero in the bitmap). In the fourth configuration type, the SRS resource identifier may be configured as a single port transmission (e.g., using the nrofSRS-Ports information element). In some other aspects, the SRS resource identifier may be configured as a multiple (e.g., two or more) port transmission (e.g., for different frequency bands, in a similar manner as described above in connection with the first configuration type).

In some aspects, the bitmap configuration indicating the occupied symbols for the SRS resource identifier may be a constant size regardless of the number of occupied SRS symbols for the SRS configuration. For example, the bitmap configuration may be defined assuming a starting position of a first symbol of a slot and may include a number of elements that is equivalent to a number of symbols in the slot (e.g., may include 14 elements assuming that each slot includes 14 symbols). Therefore, the bitmap configuration may indicate occupied SRS symbols (e.g., using a value of "1" in the bitmap configuration) and may indicate unoccupied SRS symbols (e.g., using a value of "0" in the bitmap configuration) for all symbols in a slot. In such examples, the intra-slot start position may not be included in the SRS configuration. For example, as the bitmap configuration is a constant size and assumes a starting position of a first symbol of a slot, the intra-slot start position may not be needed. For example, the configuration information may not indicate information associated with the intra-slot start position (e.g., to conserve signaling overhead and an RRC configuration structure volume, as this information may be implicitly indicated by the bitmap configuration).

In some aspects, the configuration information may indicate that the SRS resource set is a periodic SRS resource set, an aperiodic SRS resource set, or a semi-persistent SRS resource set (e.g., in any of the first, second, third, or fourth configuration types described above). Similarly, one or more of the SRS resources (e.g., one or more of the SRS resource identifiers) may be configured to be periodic, aperiodic, or semi-persistent. For example, the base station 110 may configure the SRS resource set (or SRS resources) for Doppler tracking to be periodic, semi-persistent, or aperiodic using an information element included in the configuration information.

As shown by reference number 620, the UE 120 may determine the SRS configuration based at least in part on receiving the configuration information. As shown by reference number 625, the UE 120 may transmit, and the base station 110 may receive, a Doppler tracking SRS using SRS resources indicated by the configuration information. For example, the UE 120 may transmit repetitions of the SRS to base station 110 in accordance with the configuration information. In one example, the UE 120 may transmit a set of SRS repetitions in the same subframe or a same slot. For instance, the UE 120 may transmit a first repetition of the SRS in a first symbol location of a slot, transmit a second repetition of the SRS in a second symbol location of the slot, and transmit a third repetition of the SRS in a third symbol location of the slot.

The Doppler tracking SRS repetitions may be transmitted by the UE 120 using a single port (e.g., antenna port or SRS port) or multiple ports (e.g., multiple antenna ports or multiple SRS ports). For example, the UE 120 may be configured to use a single port or may be configured to use multiple ports for the Doppler tracking SRSs. When multiple ports are used, the ports may be quasi co-located to facilitate Doppler parameter estimation. In the case of beam-based transmission, the Doppler tracking SRS repetitions may be transmitted using the same transmission beam and/or the same antenna panel. In some aspects, the Doppler tracking SRS repetitions may be transmitted over the entire bandwidth part assigned to UE 120. Alternatively, the Doppler tracking SRS repetitions may be transmitted over a portion of the bandwidth part assigned to UE 120.

As shown by reference number 630, the base station 110 may measure the Doppler tracking SRS received from the UE 120. For example, the base station 110 may measure a first set (e.g., pair) of SRS repetitions that are received in the same subframe or same slot. For instance, the base station 110 may measure a first repetition pair including the SRS received in a first SRS symbol of a slot and the SRS received in a second SRS symbol of the slot. Additionally, the base station 110 may measure a second set (e.g., pair) of SRS repetitions that are received in the same subframe or same slot. In some aspects, a time gap associated with the first set (e.g., pair) of SRS repetitions may be different than a time gap associated with the second set (e.g., pair) of SRS repetitions (e.g., to enable the base station 110 to estimate different Doppler parameters using the first set of SRS repetitions and the second set of SRS repetitions). In some aspects, the first set of SRS repetitions and the second set of SRS repetitions may include one or more common SRS repetitions or SRS symbols. For example, the configuration information may configure the UE 120 to transmit an SRS on a first symbol, a third symbol, and a sixth symbol of a slot. The first set of SRS repetitions may include the SRS transmitted on the first symbol and the third symbol (e.g., to enable the base station 110 to estimate an uplink Doppler shift). The second set of SRS repetitions may include the SRS transmitted on the first symbol and the sixth symbol (e.g., to enable the base station 110 to estimate an uplink Doppler spread).

As shown by reference number 635, the base station 110 may estimate one or more uplink Doppler parameters using the SRS transmitted by the UE 120. For example, the base station 110 may measure the SRS messages to estimate a Doppler shift or a frequency offset for the uplink channel. Additionally, or alternatively, the base station 110 may measure the SRS messages to estimate a Doppler spread or a time correlation for the uplink channel. For example, the base station 110 may determine a correlation in time between the SRS repetitions based on the measurements performed by the base station 110. In some aspects, the base station 110 may measure a differential phase of a set of SRS repetitions to determine a phase offset between the set (e.g., pair) of SRS repetitions. The base station 110 may estimate a Doppler shift for the uplink channel based at least in part on the measured phase offset or difference.

For example, the base station 110 may use the Doppler tracking SRSs transmitted by the UE 120 for implicit Doppler shift signaling (e.g., in a high mobility scenario, such as in an HST SFN scenario). The base station 110 (e.g., the network) may apply Doppler shift pre-compensation for one or more TRPs in a downlink SFN scenario (e.g., such as when the one or more TRPs are transmitting downlink communications simultaneously using the same time/frequency resources). The Doppler shift pre-compensation may be based at least in part implicit Doppler shift signaling or indication by the UE 120 (e.g., using Doppler tacking SRSs). Additionally, or alternatively, the base station 110 may use the Doppler tracking SRSs transmitted by the UE 120 for improved uplink DMRS configuration determinations or selections.

In some aspects, the base station 110 may determine other characteristics, conditions, parameters, and/or metrics, such as delay spread for the uplink channel, the power level used to transmit the uplink reference signal relative to a power level used to transmit data, and/or a link quality characteristic (e.g., reception SNR and post-processing SINR) for the uplink channel.

In some aspects, the base station 110 may estimate an uplink Doppler parameter using the Doppler tracking SRS transmitted by the UE 120 using different time gaps to estimate the Doppler parameter. For example, the base station 110 may perform a first estimation for the Doppler parameter using a first time gap associated with the Doppler tracking SRS resource(s) transmitted by the UE 120. The base station 110 may perform a second estimation for the Doppler parameter using a second time associated with the Doppler tracking SRS resource(s) transmitted by the UE 120. The first time gap may be smaller than the second time gap. For example, the first estimation may provide additional robustness with respect to phase ambiguity or Doppler aliasing (e.g., the smaller time gap may mitigate a risk of phase ambiguity or Doppler aliasing), but the first estimation may provide a lower accuracy due to the smaller time gap. The base station 110 may use the first estimation to apply a correction factor to compensate for the frequency offset or Doppler shift estimated from the first estimation (e.g., for the second estimation). In some aspects, the second time gap may be based at least in part on (e.g., may be defined) by an accuracy of the first estimation (e.g., may be deterministic of fixed for each SNR), rather than being defined by a speed range of the UE 120. By using the larger second time gap, an accuracy of the uplink Doppler parameter estimation may be improved. Therefore, by estimating the uplink Doppler parameter using the Doppler tracking SRS using the two-step approach described above (e.g., a first coarse estimation and a second fine estimation), an accuracy of the estimation may be improved and the estimation may have improved robustness to phase ambiguity or Doppler aliasing.

As a result, the base station 110 may be enabled to perform accurate and robust Doppler parameter estimation for an uplink channel using a configured Doppler tracking SRS. For example, the base station 110 may be enabled to optimize multiple, different, time gaps between symbols associated with an SRS transmission for Doppler parameter estimation. The base station 110 may be enabled to configure the symbols on which an SRS transmission occurs to optimize the temporal spacing between the SRS transmissions for Doppler parameter estimation. As a result, the base station 110 may be enabled to perform different Doppler parameter estimations using the same SRS resource set and the one or more transmission occurrences associated with the SRS resource set. For example, the base station 110 may be enabled to perform uplink Doppler shift estimation using a first time gap associated with the SRS resource set and/or may be enabled to perform uplink Doppler spread estimation using a second (different) time gap associated with the SRS resource set. Accurate uplink Doppler parameter estimation may improve uplink DMRS configuration selection, synchronization loops tracking by the base station 110, pre-compensation of a frequency offset for the downlink channel (for example in case of HST SFN scenario where a transmission scheme 1 (e.g., as defined, or otherwise fixed by a wireless communication standard) and Doppler shift pre-compensation is employed for downlink transmissions), and/or uplink channel estimation, among other examples.

As shown by reference number 640, in some aspects, the base station 110 may determine a modification to the SRS configuration. For example, the base station 110 may determine that one or more fields or parameters indicated by the configuration information (e.g., transmitted to the UE 120 as described above in connection with reference number 615) should be modified. For example, the base station 110 may determine that a time gap associated with the SRS resource set configuration should be changed based at least in part on a change in channel conditions, a change in UE 120 movement information (e.g., UE 120 speed), uplink channel SNR and/or a change in deployment parameters (e.g., a change in subcarrier spacing or carrier frequency), among other examples. For example, the base station 110 may determine a modified intra-slot starting position for the SRS resource set (e.g., the base station 110 may determine that at least one SRS resource should be transmitted on a different OFDM symbol than an OFDM symbol indicated by the configuration information) to modify a time gap associated with the SRS resource set. The modified time gap may enable the base station 110 to make improved Doppler parameter estimations based at least in part on changes in communication parameters or conditions between the base station 110 and the UE 120 (e.g., as described above).

In some aspects, the base station 110 may determine that a Doppler parameter estimation is no longer needed to be performed. For example, the configuration information may be determined by the base station 110 to enable the base station 110 to perform both uplink Doppler shift estimation and uplink Doppler spread estimation. The base station 110 may determine that one of uplink Doppler shift estimation or uplink Doppler spread estimation no longer needs to be performed by the base station 110. Therefore, the base station 110 may determine that the UE 120 is transmitting more SRS resources than are necessary for estimating a single Doppler parameter (e.g., transmitting SRS resources with two different time gaps and/or transmitting SRS resources on at least 3 different, non-consecutive OFDM symbols). Therefore, the base station 110 may determine that the configuration information should be modified to conserve overhead associated with the Doppler tracking SRS. For example, the base station 110 may determine that at least one SRS resource associated with the SRS resource set should be deactivated. Alternatively, if the base station 110 determines that an additional uplink Doppler parameter needs to be estimated, then the base station 110 may determine that at least one SRS resource (e.g., that is currently deactivated) associated with the SRS resource set should be activated.

In some aspects, the base station 110 may dynamically determine a reconfiguration for the SRS resources included in the SRS resource set based at least in part on one or more of the considerations described herein. In some aspects, the base station 110 may dynamically determine a reconfiguration for a periodic SRS resource, a semi-persistent SRS resource, and/or an aperiodic SRS resource. The dynamic reconfiguration for the SRS resource set described herein is described in connection with a semi-persistent SRS resource or semi-persistent SRS resource set. However, similar operations may be performed for a periodic SRS resource set and/or an aperiodic SRS resource set and the corresponding SRS resources. For example, periodic SRS resource sets may be capable of being modified using RRC signaling. However, RRC procedures may be unable to adapt to changes in channel and reception conditions (e.g., because RRC reconfiguration procedures are non-synchronous and associated with high latency and as a result involve some ambiguity period related to a periodic signal transmission).

As shown by reference number 645, the base station 110 may transmit, and the UE 120 may receive, reconfiguration information associated with the SRS resource set and the SRS resources associated with the SRS resource set, where the reconfiguration information modifies one or more parameters indicated by the initial configuration information or a previous reconfiguration. For example, the base station 110 may transmit one or more MAC-CE messages indicating the reconfiguration information (e.g., as MAC-CE signaling procedures are time synchronous). In some aspects, the base station 110 may transmit an indication of a modified intra-slot start position for one or more SRS resources indicated by the configuration information. For example, for the first configuration type or the second configuration type described above, the base station 110 may modify a value indicated in an intra-slot start position field (e.g., a startPosition information element) associated with an SRS resource identifier. Additionally, or alternatively, for the first configuration type or the second configuration type described above, the base station 110 may transmit an indication of an activation or a deactivation for one or more SRS resources associated with the Doppler tracking SRS resource set as indicated by the configuration information (or previous reconfiguration information). For example, the base station 110 may deactivate an SRS resource to conserve resources when multiple uplink Doppler parameter estimations are not needed. Alternatively, the base station 110 may activate an SRS resource to enable the base station 110 to perform multiple uplink Doppler parameter estimations (e.g., using the different time gaps associated with the SRS resource set).

In some aspects, the base station 110 may transmit an indication of a modified intra-slot start position field for an SRS resource, where the modified intra-slot start position field indicates multiple intra-slot start positions for the SRS resource. For example, for the third configuration type described above, the base station 110 may determine a new set of values to be indicated in the single intra-slot start position field. In some aspects, the base station 110 may implicitly activate or deactivate an SRS resource by transmitting a modified intra-slot start position field that includes a different number of values than a number of values included in the intra-slot start position field indicated by the configuration information (e.g., the base station 110 may modify a number of symbols associated with an SRS resource identifier). The indication of the modified intra-slot start position field may indicate a different number of intra-slot start positions for the SRS resource than a number of intra-slot start positions indicated by an intra-slot start position field indicated by the configuration information. For example, if the configuration information indicated an intra-slot start position field of (2, 4, 7) and the modified intra-slot start position field indicates (4, 7), the SRS symbol that was to be transmitted in the symbol associated with index "2" may be implicitly deactivated (e.g., may be removed from the list of SRS symbol indexes associated with the corresponding SRS resource or Doppler tracking SRS resource set transmissions). The number of values included in the modified intra-slot start position field may implicitly indicate the number of SRS symbols associated with the reconfigured SRS resource and the corresponding SRS resource set.

In some aspects, the base station 110 may transmit an indication of a modified bitmap configuration indicating occupied symbols for an SRS resource indicated by the configuration information. For example, for the fourth configuration type described above, the base station 110 may transmit an indication of occupied symbols for the SRS resource that is different than the indication of occupied symbols for the SRS resource transmitted in the initial configuration information or previous reconfiguration information. In some aspects, the base station 110 may transmit an indication of a modified intra-slot start position associated with the SRS resource and the bitmap configuration. For example, the base station 110 may modify an intra-slot reference point (e.g., the intra-slot start position) for the bitmap. A modification of the intra-slot reference point for the bitmap may also require an indication of a modified bitmap configuration (e.g., as the modified intra-slot reference point may result in a bitmap configuration having a different size being configured). Similar to the third configuration type described above, the base station 110 may implicitly activate or deactivate SRS symbols or locations by transmitting a modified bitmap that includes a different number of non-zero elements (e.g., elements with a value of "1") than a number of non-zero elements included in the bitmap indicated by the initial configuration information or the previous reconfiguration information. As described above, in some aspects, the bitmap configuration may be a constant size (e.g., corresponding to a number of symbols in each slot). In such examples, the base station 110 may not modify an intra-slot start position (e.g., as the intra-slot start position may not be included in the SRS resource configuration). Rather, the base station 110 may indicate a modified bitmap configuration (e.g., having a size that is the same as the bitmap configuration indicated in the configuration information and/or previous reconfiguration information) having different values for elements of the modified bitmap configuration (e.g., as compared to the bitmap configuration indicated in the configuration information and/or previous reconfiguration information).

As shown by reference number 650, the UE 120 may determine the modified parameter(s) for the SRS configuration based at least in part on receiving the reconfiguration information. As shown by reference number 655, the UE 120 may transmit, and the base station 110 may receive, a Doppler tracking SRS using SRS resources indicated by the reconfiguration information. As a result, the base station 110 may be enabled to dynamically reconfigure or modify the SRS resource set for Doppler tracking to be optimized, as Doppler parameter estimations to be performed, carrier frequency, a subcarrier spacing, a channel condition, SNR, a channel type, and/or movement information associated with the UE 120, among other examples, change over time. This may provide additional scheduling flexibility for the base station 110. Moreover, this may improve an accuracy and robustness of uplink Doppler parameter estimations performed by the base station 110 as channel parameters and/or conditions change.

As indicated above, FIG. 6 is provided as an example. Other examples may differ from what is described with respect to FIG. 6.

Figure 7:
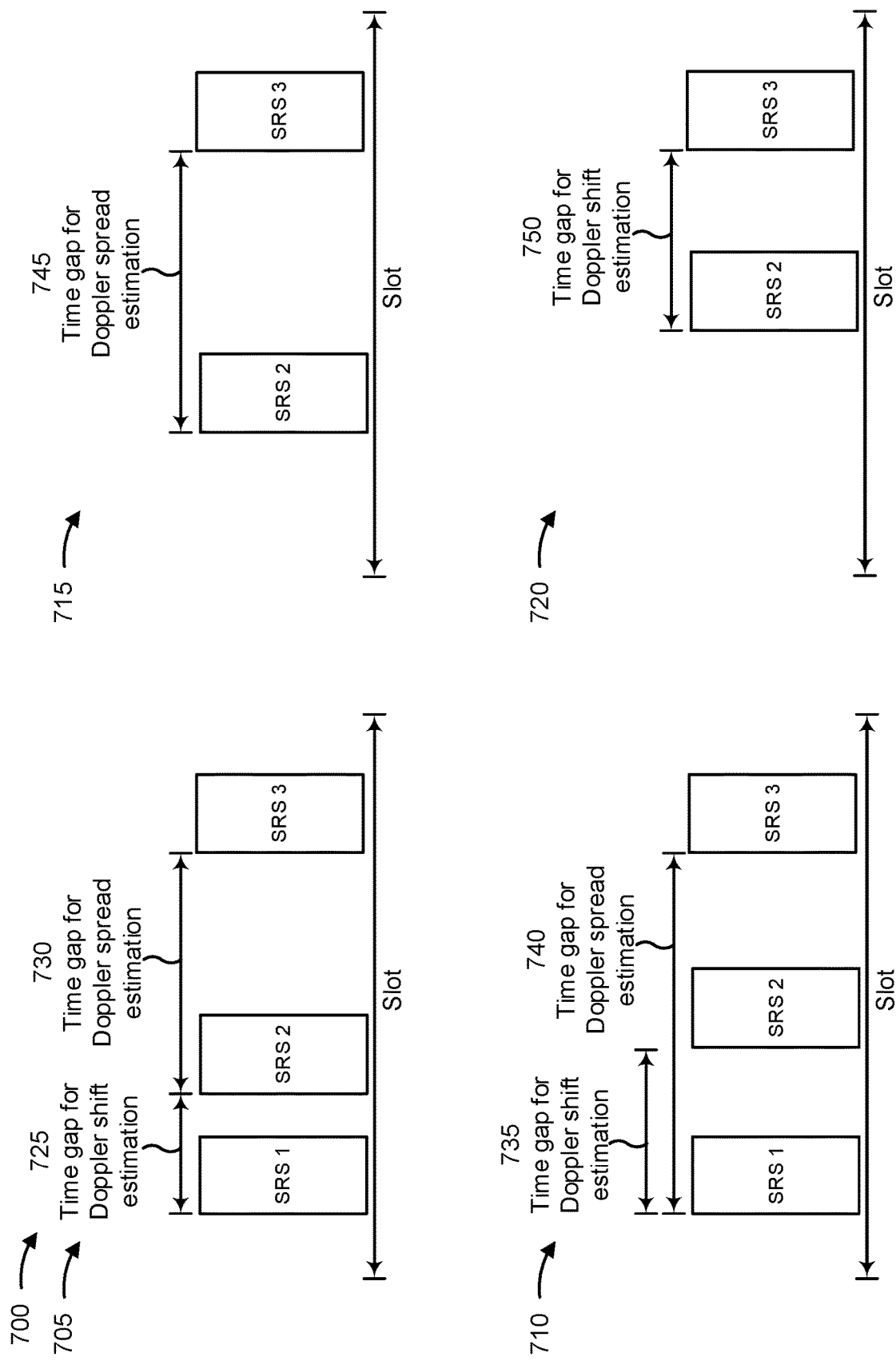
FIG. 7 is a diagram illustrating an example associated with Doppler tracking SRS resource sets, in accordance with the present disclosure.

FIG. 7 is a diagram illustrating an example 700 associated with Doppler tracking SRS resource sets, in accordance with the present disclosure. As shown in FIG. 7, example 700 includes a first Doppler tracking SRS resource set 705, a second Doppler tracking SRS resource set 710, a third Doppler tracking SRS resource set 715, and a fourth Doppler tracking SRS resource set 720. The one or more Doppler tracking SRS resource sets may be configured by a base station 110 in a similar manner as described above in connection with FIG. 6.

As shown in FIG. 7, the first Doppler tracking SRS resource set 705, the second Doppler tracking SRS resource set 710, the third Doppler tracking SRS resource set 715, and the fourth Doppler tracking SRS resource set 720 may include one or more SRS symbols or resources, such as a first SRS resource or SRS symbol (shown as "SRS 1"), a second SRS resource or SRS symbol (shown as "SRS 2") and/or a third SRS resource or SRS symbol (shown as "SRS 3"). The SRS resources depicted in FIG. 7 may occupy a single symbol or multiple symbols (e.g., two symbols) within a slot.

The first Doppler tracking SRS resource set 705 may include a first SRS resource (shown as "SRS 1"), a second SRS resource (shown as "SRS 2") and a third SRS resource (shown as "SRS 3") to enable the base station 110 to perform both uplink Doppler shift estimation and uplink Doppler spread estimation. For example, as shown by reference number 725, a first time gap between the first SRS resource and the second SRS resource may be used by the base station 110 for uplink Doppler shift estimation. Additionally, as shown by reference number 730, a second time gap between the second SRS resource and the third SRS resource may be used by the base station 110 for Doppler spread estimation. As the first and second time gaps may be associated with different lengths (e.g., based at least in part on the configuration or reconfiguration information associated with the first SRS resource set 705 or SRS resource identifiers associated with the first SRS resource set 705), the base station 110 may be enabled to accurately estimate both Doppler shift and Doppler spread for the uplink channel. Moreover, the base station 110 may be enabled to perform Doppler spread estimation after Doppler shift estimation, thereby enabling the base station 110 to remove an estimated Doppler shift from the signal when performing the Doppler spread estimation (e.g., decoupling of Doppler shift and Doppler spread characteristics). In some aspects, the first SRS resource set 705 may be configured by a base station 110 when the base station 110 needs to perform both Doppler shift and Doppler spread for the uplink channel, such as in an HST-SFN scenario in which the base station 110 utilizes implicit Doppler shift signaling to perform frequency offset pre-compensation for one or more TRPs involved in downlink transmissions using an SFN transmission scheme.

The second Doppler tracking SRS resource set 710 may include a first SRS resource (shown as "SRS 1"), a second SRS resource (shown as "SRS 2") and a third SRS resource (shown as "SRS 3") to enable the base station 110 to perform both uplink Doppler shift estimation and uplink Doppler spread estimation. For example, as shown by reference number 735, a first time gap between the first SRS resource and the second SRS resource may be used by the base station 110 for uplink Doppler shift estimation. Additionally, as shown by reference number 740, a second time gap between the first SRS resource and the third SRS resource may be used by the base station 110 for Doppler spread estimation. For example, the base station 110 may use the longer time gap (e.g., between the first SRS resource and the third SRS resource) for Doppler spread estimation based at least in part on a channel type (e.g., if the channel type is a CDL channel type or model and is associated with a strong LOS for a dominant path) to improve the Doppler spread estimation for the uplink channel.

The third Doppler tracking SRS resource set 715 may include a second SRS resource (shown as "SRS 2") and a third SRS resource (shown as "SRS 3") to enable the base station 110 to perform a single Doppler parameter estimation (e.g., a Doppler spread estimation). For example, the third Doppler tracking SRS resource set 715 may be associated with a first SRS resource (not shown in FIG. 7) that is deactivated by the base station 110. For example, the base station 110 may not need to perform a Doppler shift estimation for the uplink channel. Therefore, the base station 110 may dynamically deactivate the first SRS resource associated with the third Doppler tracking SRS resource set 715 to conserve resources. As shown by reference number 745, a time gap between the second SRS resource and the third SRS resource may be used by the base station 110 for Doppler spread estimation of the uplink channel.

Similarly, the fourth Doppler tracking SRS resource set 720 may include a second SRS resource (shown as "SRS 2") and a third SRS resource (shown as "SRS 3") to enable the base station 110 to perform a single Doppler parameter estimation (e.g., a Doppler shift estimation). For example, the fourth Doppler tracking SRS resource set 720 may be associated with a first SRS resource (not shown in FIG. 7) that is deactivated by the base station 110. For example, the base station 110 may not need to perform a Doppler spread estimation for the uplink channel. Therefore, the base station 110 may dynamically deactivate the first SRS resource associated with the fourth Doppler tracking SRS resource set 720 to conserve resources. As shown by reference number 750, a time gap between the second SRS resource and the third SRS resource may be used by the base station 110 for Doppler shift estimation of the uplink channel.

As described above in connection with FIG. 6, a position of the SRS resources depicted in FIG. 7 may be selected or determined by the base station 110 to optimize the time gaps for different uplink Doppler parameter estimations. For example, the base station 110 may transmit configuration information (or reconfiguration information) to indicate a symbol position of the different SRS resources within a slot. As a result, the base station 110 may be enabled to optimize different time gaps (e.g., having different durations) to enable the base station 110 to make different and/or improved Doppler parameter estimations for the uplink channel.

As indicated above, FIG. 7 is provided as an example. Other examples may differ from what is described with respect to FIG. 7.

Figure 8:
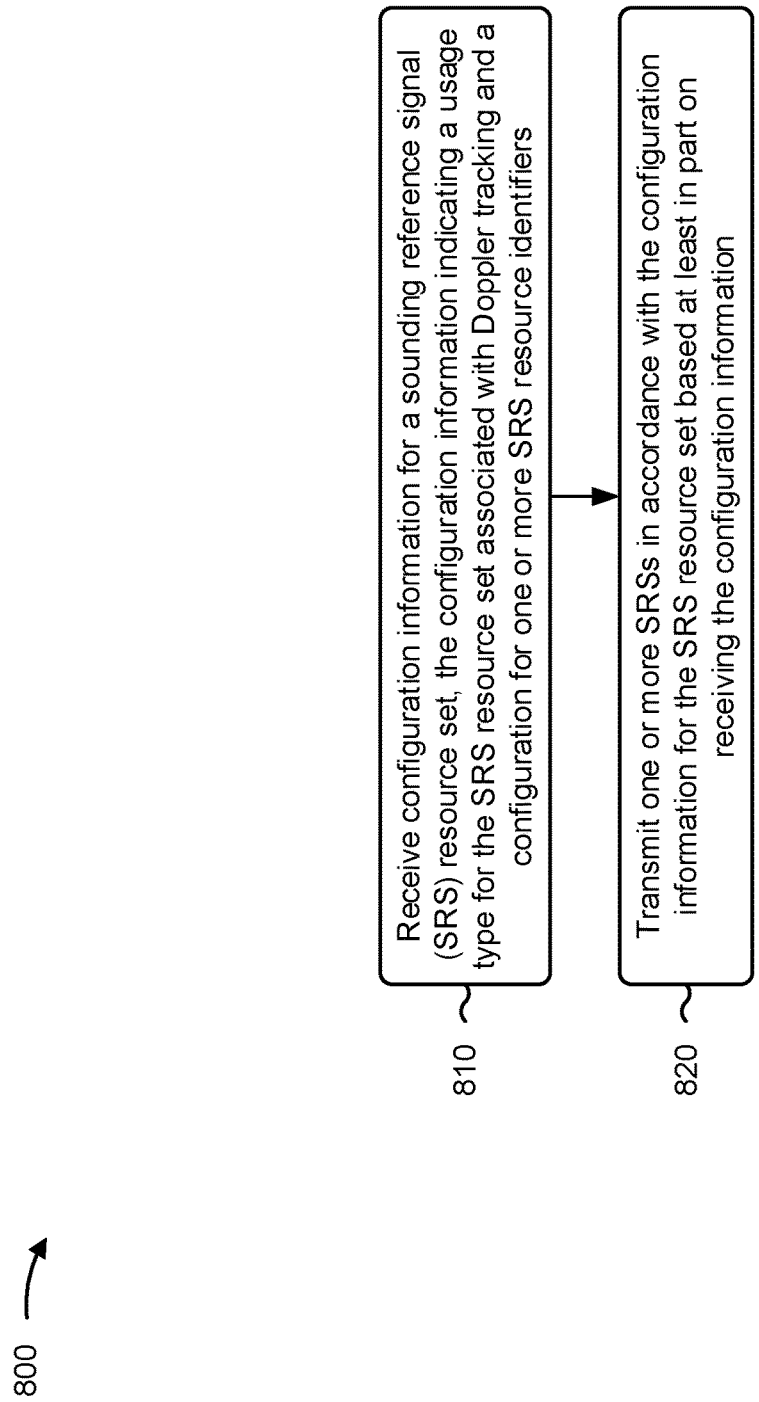
FIGS. 8 and 9 are diagrams illustrating example processes associated with configurations and dynamic signaling for Doppler tracking SRS resource sets, in accordance with the present disclosure.

FIG. 8 is a diagram illustrating an example process 800 performed, for example, by a UE, in accordance with the present disclosure. Example process 800 is an example where the UE (e.g., UE 120) performs operations associated with enabling configurations for doppler tracking SRS resource sets.

As shown in FIG. 8, in some aspects, process 800 may include receiving configuration information for an SRS resource set, the configuration information indicating a usage type for the SRS resource set associated with Doppler tracking and a configuration for one or more SRS resource identifiers (block 810). For example, the UE (e.g., using communication manager 140 and/or reception component 1002, depicted in FIG. 10) may receive configuration information for an SRS resource set, the configuration information indicating a usage type for the SRS resource set associated with Doppler tracking and a configuration for one or more SRS resource identifiers, as described above.

As further shown in FIG. 8, in some aspects, process 800 may include transmitting one or more SRSs in accordance with the configuration information for the SRS resource set based at least in part on receiving the configuration information (block 820). For example, the UE (e.g., using communication manager 140 and/or transmission component 1004, depicted in FIG. 10) may transmit one or more SRSs in accordance with the configuration information for the SRS resource set based at least in part on receiving the configuration information, as described above.

Process 800 may include additional aspects, such as any single aspect or any combination of aspects described below and/or in connection with one or more other processes described elsewhere herein.

In a first aspect, receiving the configuration information includes receiving an indication of two or more SRS resource identifiers associated with the SRS resource set, and receiving, for each SRS resource identifier of the two or more SRS resource identifiers, an indication of an intra-slot start position for an SRS resource associated with each SRS resource identifier of the two or more SRS identifiers.

In a second aspect, alone or in combination with the first aspect, receiving the configuration information includes receiving an indication that each of the two or more SRS identifiers are configured to use a single symbol.

In a third aspect, alone or in combination with one or more of the first and second aspects, receiving the configuration information includes receiving an indication of the one or more SRS resource identifiers associated with the SRS resource set, and receiving, for each SRS resource identifier of the one or more SRS resource identifiers, an indication of an intra-slot start position, a number of repetitions, and a number of symbols for an SRS resource associated with each SRS resource identifier.

In a fourth aspect, alone or in combination with one or more of the first through third aspects, receiving the configuration information includes receiving an indication that an SRS resource identifier of the one or more SRS resource identifiers is associated with at least one of one symbol and one repetition, or two symbols and two repetitions.

In a fifth aspect, alone or in combination with one or more of the first through fourth aspects, receiving the configuration information includes receiving an indication that SRS resource identifiers associated with the SRS resource set are configured to use a single port.

In a sixth aspect, alone or in combination with one or more of the first through fifth aspects, receiving the configuration information includes receiving an indication that SRS resource identifiers associated with the SRS resource set are configured to use multiple ports.

In a seventh aspect, alone or in combination with one or more of the first through sixth aspects, receiving the configuration information includes receiving an indication of an SRS resource identifier associated with the SRS resource set, and receiving an indication of multiple intra-slot start positions associated with the SRS resource identifier using a single configuration field associated with the SRS resource identifier.

In an eighth aspect, alone or in combination with one or more of the first through seventh aspects, a number of the multiple intra-slot start positions indicates a number of symbols associated with the SRS resource identifier.

In a ninth aspect, alone or in combination with one or more of the first through eighth aspects, the configuration information does not indicate information associated with a repetition factor or a number of symbols for the SRS resource identifier.

In a tenth aspect, alone or in combination with one or more of the first through ninth aspects, receiving the configuration information includes receiving an indication of an SRS resource identifier associated with the SRS resource set, receiving an indication of an intra-slot start position associated with the SRS resource identifier, and receiving an indication of occupied symbols for the SRS resource identifier based at least in part on the intra-slot start position.

In an eleventh aspect, alone or in combination with one or more of the first through tenth aspects, receiving the indication of the occupied symbols for the SRS resource identifier includes receiving an indication of a bitmap configuration indicating the occupied symbols for the SRS resource identifier, wherein the indication of an intra-slot start position indicates a starting position for the bitmap configuration relative to an end of a slot.

In a twelfth aspect, alone or in combination with one or more of the first through eleventh aspects, non-zero elements included in the bitmap configuration indicate occupied symbols within a slot starting from the symbol indicated by the intra-slot start position.

In a thirteenth aspect, alone or in combination with one or more of the first through twelfth aspects, receiving the configuration information includes receiving an indication that the SRS resource set is a periodic SRS resource set or that the one or more SRS resource identifiers are periodic SRS resources.

In a fourteenth aspect, alone or in combination with one or more of the first through thirteenth aspects, receiving the configuration information includes receiving an indication that the SRS resource set is a semi-persistent SRS resource set or that the one or more SRS resource identifiers are semi-persistent SRS resources.

In a fifteenth aspect, alone or in combination with one or more of the first through fourteenth aspects, receiving the configuration information includes receiving an indication that the SRS resource set is an aperiodic SRS resource set or that the one or more SRS resource identifiers are aperiodic SRS resources.

In a sixteenth aspect, alone or in combination with one or more of the first through fifteenth aspects, process 800 includes receiving reconfiguration information associated with the SRS resource set or at least one of the one or more of the SRS resource identifiers, wherein the reconfiguration information modifies one or more parameters indicated by the configuration information.

In a seventeenth aspect, alone or in combination with one or more of the first through sixteenth aspects, receiving the reconfiguration information includes receiving one or more MAC-CE messages indicating the reconfiguration information.

In an eighteenth aspect, alone or in combination with one or more of the first through seventeenth aspects, receiving the reconfiguration information includes receiving an indication of a modified intra-slot start position for one or more SRS resources indicated by the configuration information.

In a nineteenth aspect, alone or in combination with one or more of the first through eighteenth aspects, receiving the reconfiguration information includes receiving an indication of an activation or a deactivation for one or more SRS resources indicated by the configuration information.

In a twentieth aspect, alone or in combination with one or more of the first through nineteenth aspects, receiving the reconfiguration information includes receiving an indication of a modified intra-slot start position field for an SRS resource, wherein the modified intra-slot start position field indicates multiple intra-slot start positions for the SRS resource.

In a twenty-first aspect, alone or in combination with one or more of the first through twentieth aspects, the indication of the modified intra-slot start position field indicates a different number of intra-slot start positions for the SRS resource than a number of intra-slot start positions indicated by an intra-slot start position field indicated by the configuration information or previous reconfiguration information.

In a twenty-second aspect, alone or in combination with one or more of the first through twenty-first aspects, receiving the reconfiguration information includes receiving an indication of a modified bitmap configuration indicating occupied symbols for an SRS resource indicated by the configuration information.

In a twenty-third aspect, alone or in combination with one or more of the first through twenty-second aspects, the modified bitmap configuration is associated with a size that is different than a size of a bitmap configuration indicated by the configuration information.

In a twenty-fourth aspect, alone or in combination with one or more of the first through twenty-third aspects, the one or more SRS resources associated with the SRS resource set are a periodic SRS resource, a semi-persistent SRS resource, or an aperiodic SRS resource.

In a twenty-fifth aspect, alone or in combination with one or more of the first through twenty-fourth aspects, process 800 includes transmitting an indication of a capability of the UE to maintain intra slot phase coherency between SRS symbols associated with the SRS resource set, wherein the configuration information is based at least in part on the capability.

In a twenty-sixth aspect, alone or in combination with one or more of the first through twenty-fifth aspects, transmitting the indication of the capability includes transmitting an indication of whether the UE is capable of maintaining phase coherence between two non-consecutive symbols associated with a Doppler tracking SRS when a downlink communication is received by the UE during one or more symbols between the two non-consecutive symbols.

In a twenty-seventh aspect, alone or in combination with one or more of the first through twenty-sixth aspects, transmitting the indication of the capability includes transmitting an indication of whether the UE is capable of maintaining phase coherence between two non-consecutive symbols associated with a Doppler tracking SRS when an uplink communication is transmitted by the UE during one or more symbols between the two non-consecutive symbols.

In a twenty-eighth aspect, alone or in combination with one or more of the first through twenty-seventh aspects, transmitting the indication of the capability includes transmitting an indication of whether the UE is capable of maintaining phase coherence between two non-consecutive symbols associated with the Doppler tracking SRS when the uplink communication is associated with a different transmit power level than a transmit power level associated with symbols used for the Doppler tracking SRS.

In a twenty-ninth aspect, alone or in combination with one or more of the first through twenty-eighth aspects, transmitting the indication of the capability includes transmitting an indication of whether the UE is capable of maintaining phase coherence between two non-consecutive symbols associated with the Doppler tracking SRS when the uplink communication transmitted by the UE is associated with a different carrier frequency than a carrier frequency associated with the Doppler tracking SRS.

In a thirtieth aspect, alone or in combination with one or more of the first through twenty-ninth aspects, transmitting the indication of the capability includes transmitting an indication that the UE is capable of maintaining phase coherence between two non-consecutive symbols associated with a Doppler tracking SRS only when no communications are transmitted or received by the UE between the two non-consecutive symbols.

In a thirty-first aspect, alone or in combination with one or more of the first through thirtieth aspects, transmitting the indication of the capability includes transmitting an indication of a permissible time gap between the two non-consecutive symbols.

In a thirty-second aspect, alone or in combination with one or more of the first through thirty-first aspects, receiving the configuration information includes receiving an RRC configuration indicating the configuration information.

In a thirty-third aspect, alone or in combination with one or more of the first through thirty-second aspects, transmitting the one or more SRSs implicitly signals one or more Doppler parameters for an uplink channel.

In a thirty-fourth aspect, alone or in combination with one or more of the first through thirty-third aspects, receiving the configuration information includes receiving an indication of an SRS resource identifier associated with the SRS resource set, and receiving an indication of occupied symbols for the SRS resource identifier via a bitmap configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
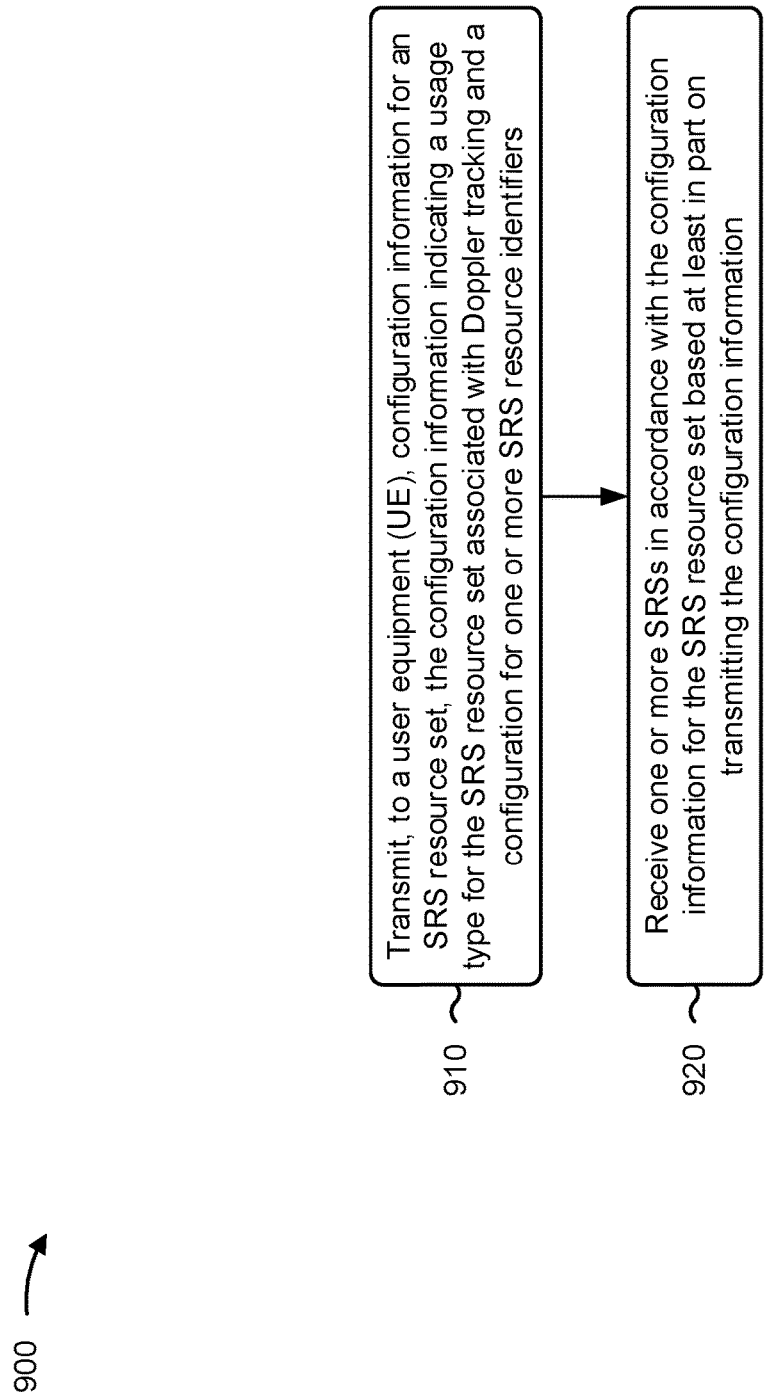

FIG. 9 is a diagram illustrating an example process 900 performed, for example, by a network entity, in accordance with the present disclosure. Example process 900 is an example where the network entity (e.g., base station 110, a CU, a DU, and/or an RU) performs operations associated with enabling configurations for doppler tracking SRS resource sets.

As shown in FIG. 9, in some aspects, process 900 may include transmitting, to a UE, configuration information for an SRS resource set, the configuration information indicating a usage type for the SRS resource set associated with Doppler tracking and a configuration for one or more SRS resource identifiers (block 910). For example, the network entity (e.g., using communication manager 150 and/or transmission component 1104, depicted in FIG. 11) may transmit, to a UE, configuration information for an SRS resource set, the configuration information indicating a usage type for the SRS resource set associated with Doppler tracking and a configuration for one or more SRS resource identifiers, as described above.

As further shown in FIG. 9, in some aspects, process 900 may include receiving one or more SRSs in accordance with the configuration information for the SRS resource set based at least in part on transmitting the configuration information (block 920). For example, the network entity (e.g., using communication manager 150 and/or reception component 1102, depicted in FIG. 11) may receive one or more SRSs in accordance with the configuration information for the SRS resource set based at least in part on transmitting the configuration information, as described above.

Process 900 may include additional aspects, such as any single aspect or any combination of aspects described below and/or in connection with one or more other processes described elsewhere herein.

In a first aspect, process 900 includes measuring the one or more SRSs to estimate a Doppler shift or a frequency offset for a channel.

In a second aspect, alone or in combination with the first aspect, process 900 includes measuring the one or more SRSs to estimate a Doppler spread or a time coherence for a channel.

In a third aspect, alone or in combination with one or more of the first and second aspects, process 900 includes determining the configuration information based at least in part on at least one of a carrier frequency, a subcarrier spacing, a channel condition, a channel type, or movement information associated with the UE.

In a fourth aspect, alone or in combination with one or more of the first through third aspects, transmitting the configuration information includes transmitting an indication of two or more SRS resource identifiers associated with the SRS resource set, and transmitting, for each SRS resource identifier of the two or more SRS resource identifiers, an indication of an intra-slot start position for an SRS resource associated with each SRS resource identifier of the two or more SRS identifiers.

In a fifth aspect, alone or in combination with one or more of the first through fourth aspects, transmitting the configuration information includes transmitting an indication that each of the two or more SRS identifiers are configured to use a single symbol.

In a sixth aspect, alone or in combination with one or more of the first through fifth aspects, transmitting the configuration information includes transmitting an indication of the one or more SRS resource identifiers associated with the SRS resource set, and transmitting, for each SRS resource identifier of the one or more SRS resource identifiers, an indication of an intra-slot start position, a number of repetitions, and a number of symbols for an SRS resource associated with each SRS resource identifier.

In a seventh aspect, alone or in combination with one or more of the first through sixth aspects, transmitting the configuration information includes transmitting an indication that an SRS resource identifier of the one or more SRS resource identifiers is associated with at least one of one symbol and one repetition, or two symbols and two repetitions.

In an eighth aspect, alone or in combination with one or more of the first through seventh aspects, transmitting the configuration information includes transmitting an indication that SRS resource identifiers associated with the SRS resource set are configured to use a single port.

In a ninth aspect, alone or in combination with one or more of the first through eighth aspects, transmitting the configuration information includes transmitting an indication that SRS resource identifiers associated with the SRS resource set are configured to use multiple ports.

In a tenth aspect, alone or in combination with one or more of the first through ninth aspects, transmitting the configuration information includes transmitting an indication of an SRS resource identifier associated with the SRS resource set, and transmitting an indication of multiple intra-slot start positions associated with the SRS resource identifier using a configuration field associated with the SRS resource identifier.

In an eleventh aspect, alone or in combination with one or more of the first through tenth aspects, a number of the multiple intra-slot start positions indicates a number of symbols associated with the SRS resource identifier.

In a twelfth aspect, alone or in combination with one or more of the first through eleventh aspects, the configuration information does not indicate information associated with a repetition factor or a number of symbols for the SRS resource identifier.

In a thirteenth aspect, alone or in combination with one or more of the first through twelfth aspects, transmitting the configuration information includes transmitting an indication of an SRS resource identifier associated with the SRS resource set, transmitting an indication of an intra-slot start position associated with the SRS resource identifier, and transmitting an indication of occupied symbols for the SRS resource identifier based at least in part on the intra-slot start position.

In a fourteenth aspect, alone or in combination with one or more of the first through thirteenth aspects, transmitting the indication of the occupied symbols for the SRS resource identifier includes transmitting an indication of a bitmap configuration indicating the occupied symbols for the SRS resource identifier, wherein the indication of an intra-slot start position indicates a starting position for the bitmap configuration relative to an end of a slot.

In a fifteenth aspect, alone or in combination with one or more of the first through fourteenth aspects, process 900 includes configuring non-zero elements included in the bitmap configuration to indicate occupied symbols within a slot starting from the symbol indicated by the intra-slot start position.

In a sixteenth aspect, alone or in combination with one or more of the first through fifteenth aspects, transmitting the configuration information includes transmitting an indication that the SRS resource set is a periodic SRS resource set or that the one or more SRS resource identifiers are periodic SRS resources.

In a seventeenth aspect, alone or in combination with one or more of the first through sixteenth aspects, transmitting the configuration information includes transmitting an indication that the SRS resource set is a semi-persistent SRS resource set or that the one or more SRS resource identifiers are semi-persistent SRS resources.

In an eighteenth aspect, alone or in combination with one or more of the first through seventeenth aspects, transmitting the configuration information includes transmitting an indication that the SRS resource set is an aperiodic SRS resource set or that the one or more SRS resource identifiers are aperiodic SRS resources.

In a nineteenth aspect, alone or in combination with one or more of the first through eighteenth aspects, process 900 includes transmitting reconfiguration information associated with the SRS resource set or at least one of the one or more SRS resource identifiers, wherein the reconfiguration information modifies one or more parameters indicated by the configuration information.

In a twentieth aspect, alone or in combination with one or more of the first through nineteenth aspects, process 900 includes determining the reconfiguration information based at least in part on at least one of a carrier frequency, a subcarrier spacing, a channel condition, a channel type, or movement information associated with the UE.

In a twenty-first aspect, alone or in combination with one or more of the first through twentieth aspects, transmitting the reconfiguration information includes transmitting one or more MAC-CE messages indicating the reconfiguration information.

In a twenty-second aspect, alone or in combination with one or more of the first through twenty-first aspects, transmitting the reconfiguration information includes transmitting an indication of a modified intra-slot start position for one or more SRS resources indicated by the configuration information.

In a twenty-third aspect, alone or in combination with one or more of the first through twenty-second aspects, transmitting the reconfiguration information includes transmitting an indication of an activation or a deactivation for one or more SRS resources indicated by the configuration information.

In a twenty-fourth aspect, alone or in combination with one or more of the first through twenty-third aspects, transmitting the reconfiguration information includes transmitting an indication of a modified intra-slot start position field for an SRS resource, wherein the modified intra-slot start position field indicates multiple intra-slot start positions for the SRS resource.

In a twenty-fifth aspect, alone or in combination with one or more of the first through twenty-fourth aspects, the indication of the modified intra-slot start position field indicates a different number of intra-slot start positions for the SRS resource than a number of intra-slot start positions indicated by an intra-slot start position field indicated by the configuration information or previous reconfiguration information.

In a twenty-sixth aspect, alone or in combination with one or more of the first through twenty-fifth aspects, transmitting the reconfiguration information includes transmitting an indication of a modified bitmap configuration indicating occupied symbols for an SRS resource indicated by the configuration information.

In a twenty-seventh aspect, alone or in combination with one or more of the first through twenty-sixth aspects, the modified bitmap configuration is associated with a size that is different than a size of a bitmap configuration indicated by the configuration information.

In a twenty-eighth aspect, alone or in combination with one or more of the first through twenty-seventh aspects, the SRS resource set or the one or more SRS resource identifiers is a periodic SRS resource, a semi-persistent SRS resource, or an aperiodic SRS resource.

In a twenty-ninth aspect, alone or in combination with one or more of the first through twenty-eighth aspects, process 900 includes receiving an indication of capability of the UE to maintain intra slot phase coherency between SRS symbols associated with the SRS resource set.

In a thirtieth aspect, alone or in combination with one or more of the first through twenty-ninth aspects, process 900 includes determining the configuration information is based at least in part on the capability of the UE.

In a thirty-first aspect, alone or in combination with one or more of the first through thirtieth aspects, receiving the indication of the capability includes receiving an indication of whether the UE is capable of maintaining phase coherence between two non-consecutive symbols associated with a Doppler tracking SRS when a downlink communication is received by the UE during one or more symbols between the two non-consecutive symbols.

In a thirty-second aspect, alone or in combination with one or more of the first through thirty-first aspects, receiving the indication of the capability includes receiving an indication of whether the UE is capable of maintaining phase coherence between two non-consecutive symbols associated with a Doppler tracking SRS when an uplink communication is transmitted by the UE during one or more symbols between the two non-consecutive symbols.

In a thirty-third aspect, alone or in combination with one or more of the first through thirty-second aspects, receiving the indication of the capability includes receiving an indication of whether the UE is capable of maintaining phase coherence between two non-consecutive symbols associated with the Doppler tracking SRS when the uplink communication is associated with a different transmit power level than a transmit power level associated with symbols used for the Doppler tracking SRS.

In a thirty-fourth aspect, alone or in combination with one or more of the first through thirty-third aspects, receiving the indication of the capability includes receiving an indication of whether the UE is capable of maintaining phase coherence between two non-consecutive symbols associated with the Doppler tracking SRS when the uplink communication transmitted by the UE is associated with a different carrier frequency than a carrier frequency associated with the Doppler tracking SRS.

In a thirty-fifth aspect, alone or in combination with one or more of the first through thirty-fourth aspects, receiving the indication of the capability includes receiving an indication that the UE is capable of maintaining phase coherence between two non-consecutive symbols associated with a Doppler tracking SRS only when no communications are transmitted or received by the UE between the two non-consecutive symbols.

In a thirty-sixth aspect, alone or in combination with one or more of the first through thirty-fifth aspects, receiving the indication of the capability includes receiving an indication of a permissible time gap between the two non-consecutive symbols.

In a thirty-seventh aspect, alone or in combination with one or more of the first through thirty-sixth aspects, transmitting the configuration information includes transmitting an RRC configuration indicating the configuration information.

In a thirty-eighth aspect, alone or in combination with one or more of the first through thirty-seventh aspects, receiving the one or more SRSs implicitly signals one or more Doppler parameters for an uplink channel.

In a thirty-ninth aspect, alone or in combination with one or more of the first through thirty-eighth aspects, transmitting the configuration information includes transmitting an indication of an SRS resource identifier associated with the SRS resource set, and transmitting an indication of occupied symbols for the SRS resource identifier via a bitmap configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
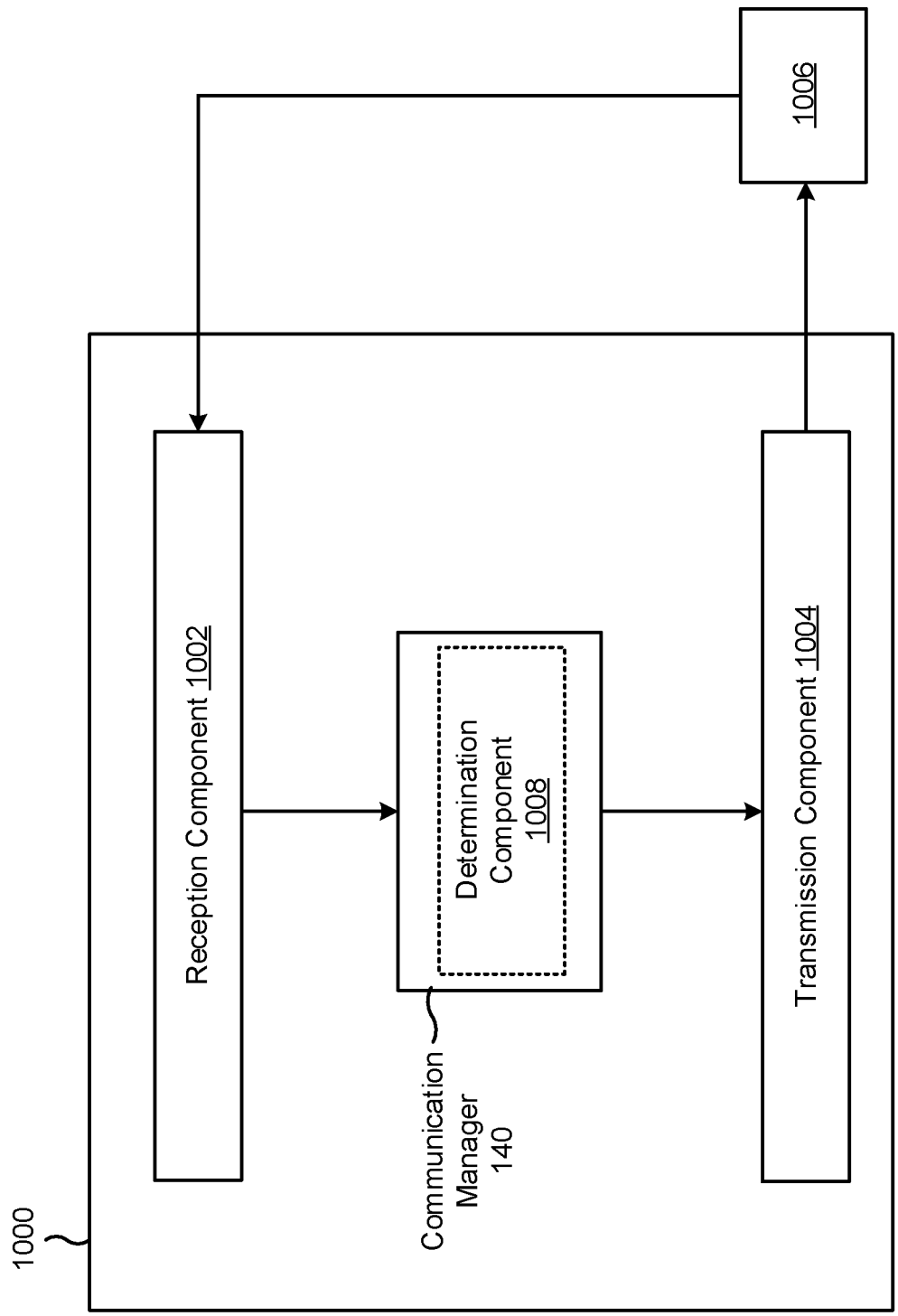
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1100 may include the communication manager 140. The communication manager 140 may include a determination component 1008, among other examples.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive configuration information for an SRS resource set, the configuration information indicating a usage type for the SRS resource set associated with Doppler tracking and a configuration for one or more SRS resource identifiers. The transmission component 1004 may transmit one or more SRSs in accordance with the configuration information for the SRS resource set based at least in part on receiving the configuration information.

The determination component 1008 may determine a resource allocation for SRS resources included in the SRS resource set based at least in part on the configuration information.

The reception component 1002 may receive reconfiguration information associated with the SRS resource set or at least one of the one or more of the SRS resource identifiers, wherein the reconfiguration information modifies one or more parameters indicated by the configuration information.

The transmission component 1004 may transmit an indication of a capability of the UE to maintain intra slot phase coherency between SRS symbols associated with the SRS resource set, wherein the configuration information is based at least in part on the capability.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
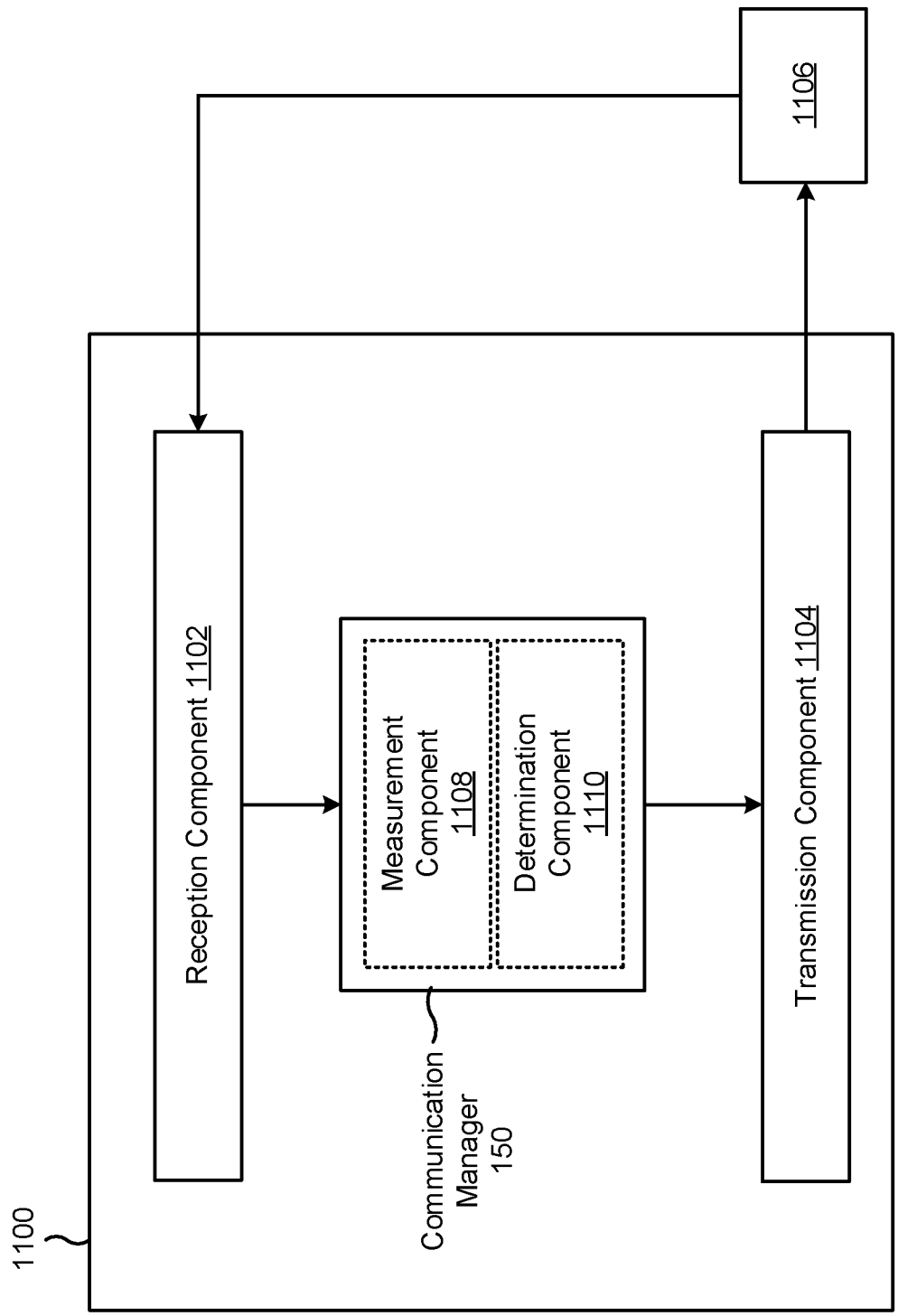

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a measurement component 1108, and/or a determination component 1110, among other examples.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit, to a UE, configuration information for an SRS resource set, the configuration information indicating a usage type for the SRS resource set associated with Doppler tracking and a configuration for one or more SRS resource identifiers. The reception component 1102 may receive one or more SRSs in accordance with the configuration information for the SRS resource set based at least in part on transmitting the configuration information.

The measurement component 1108 may measure the one or more SRSs to estimate a Doppler shift or a frequency offset for a channel.

The measurement component 1108 may measure the one or more SRSs to estimate a Doppler spread or a time coherence for a channel.

The determination component 1110 may determine the configuration information based at least in part on at least one of a carrier frequency, a subcarrier spacing, a channel condition, a channel type, or movement information associated with the UE.

The determination component 1110 may configure non-zero elements included in the bitmap configuration to indicate occupied symbols within a slot starting from the symbol indicated by the intra-slot start position.

The transmission component 1104 may transmit reconfiguration information associated with the SRS resource set or at least one of the one or more SRS resource identifiers, wherein the reconfiguration information modifies one or more parameters indicated by the configuration information.

The determination component 1110 may determine the reconfiguration information based at least in part on at least one of a carrier frequency, a subcarrier spacing, a channel condition, a channel type, or movement information associated with the UE.

The reception component 1102 may receive an indication of capability of the UE to maintain intra slot phase coherency between SRS symbols associated with the SRS resource set.

The determination component 1110 may determine the configuration information based at least in part on the capability of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving configuration information for a sounding reference signal (SRS) resource set, the configuration information indicating a usage type for the SRS resource set associated with Doppler tracking and a configuration for one or more SRS resource identifiers; and transmitting one or more SRSs in accordance with the configuration information for the SRS resource set based at least in part on receiving the configuration information.

Aspect 2: The method of Aspect 1, wherein receiving the configuration information comprises: receiving an indication of two or more SRS resource identifiers associated with the SRS resource set; and receiving, for each SRS resource identifier of the two or more SRS resource identifiers, an indication of an intra-slot start position for an SRS resource associated with each SRS resource identifier of the two or more SRS identifiers.

Aspect 3: The method of Aspect 2, wherein the receiving the configuration information comprises: receiving an indication that each of the two or more SRS identifiers are configured to use a single symbol.

Aspect 4: The method of any of Aspects 1-3, wherein receiving the configuration information comprises: receiving an indication of the one or more SRS resource identifiers associated with the SRS resource set; and receiving, for each SRS resource identifier of the one or more SRS resource identifiers, an indication of an intra-slot start position, a number of repetitions, and a number of symbols for an SRS resource associated with each SRS resource identifier.

Aspect 5: The method of Aspect 4, wherein receiving the configuration information comprises: receiving an indication that an SRS resource identifier of the one or more SRS resource identifiers is associated with at least one of: one symbol and one repetition, or two symbols and two repetitions.

Aspect 6: The method of any of Aspects 1-5, wherein receiving the configuration information comprises: receiving an indication that SRS resource identifiers associated with the SRS resource set are configured to use a single port.

Aspect 7: The method of any of Aspects 1-5, wherein receiving the configuration information comprises: receiving an indication that SRS resource identifiers associated with the SRS resource set are configured to use multiple ports.

Aspect 8: The method of any of Aspects 1-7, wherein receiving the configuration information comprises: receiving an indication of an SRS resource identifier associated with the SRS resource set; and receiving an indication of multiple intra-slot start positions associated with the SRS resource identifier using a single configuration field associated with the SRS resource identifier.

Aspect 9: The method of Aspect 8, wherein a number of the multiple intra-slot start positions indicates a number of symbols associated with the SRS resource identifier.

Aspect 10: The method of any of Aspects 8-9, wherein the configuration information does not indicate information associated with a repetition factor or a number of symbols for the SRS resource identifier.

Aspect 11: The method of any of Aspects 1-10, wherein receiving the configuration information comprises: receiving an indication of an SRS resource identifier associated with the SRS resource set; receiving an indication of an intra-slot start position associated with the SRS resource identifier; and receiving an indication of occupied symbols for the SRS resource identifier based at least in part on the intra-slot start position.

Aspect 12: The method of Aspect 11, wherein receiving the indication of the occupied symbols for the SRS resource identifier comprises: receiving an indication of a bitmap configuration indicating the occupied symbols for the SRS resource identifier, wherein the indication of an intra-slot start position indicates a starting position for the bitmap configuration relative to an end of a slot.

Aspect 13: The method of Aspect 12, wherein non-zero elements included in the bitmap configuration indicate occupied symbols within a slot starting from the symbol indicated by the intra-slot start position.

Aspect 14: The method of any of Aspects 1-13, wherein receiving the configuration information comprises: receiving an indication that the SRS resource set is a periodic SRS resource set or that the one or more SRS resource identifiers are periodic SRS resources.

Aspect 15: The method of any of Aspects 1-13, wherein receiving the configuration information comprises: receiving an indication that the SRS resource set is a semi-persistent SRS resource set or that the one or more SRS resource identifiers are semi-persistent SRS resources.

Aspect 16: The method of any of Aspects 1-13, wherein receiving the configuration information comprises: receiving an indication that the SRS resource set is an aperiodic SRS resource set or that the one or more SRS resource identifiers are aperiodic SRS resources.

Aspect 17: The method of any of Aspects 1-16, further comprising: receiving reconfiguration information associated with the SRS resource set or at least one of the one or more of the SRS resource identifiers, wherein the reconfiguration information modifies one or more parameters indicated by the configuration information.

Aspect 18: The method of Aspect 17, wherein receiving the reconfiguration information comprises: receiving one or more medium access control (MAC) control element (MAC-CE) messages indicating the reconfiguration information.

Aspect 19: The method of any of Aspects 17-18, wherein receiving the reconfiguration information comprises: receiving an indication of a modified intra-slot start position for one or more SRS resources indicated by the configuration information.

Aspect 20: The method of any of Aspects 17-19, wherein receiving the reconfiguration information comprises: receiving an indication of an activation or a deactivation for one or more SRS resources indicated by the configuration information.

Aspect 21: The method of any of Aspects 17-20, wherein receiving the reconfiguration information comprises: receiving an indication of a modified intra-slot start position field for an SRS resource, wherein the modified intra-slot start position field indicates multiple intra-slot start positions for the SRS resource.

Aspect 22: The method of Aspect 21, wherein the indication of the modified intra-slot start position field indicates a different number of intra-slot start positions for the SRS resource than a number of intra-slot start positions indicated by an intra-slot start position field indicated by the configuration information or previous reconfiguration information.

Aspect 23: The method of any of Aspects 17-22, wherein receiving the reconfiguration information comprises: receiving an indication of a modified bitmap configuration indicating occupied symbols for an SRS resource indicated by the configuration information.

Aspect 24: The method of Aspect 23, wherein the modified bitmap configuration is associated with a size that is different than a size of a bitmap configuration indicated by the configuration information.

Aspect 25: The method of any of Aspects 17-24, wherein the one or more SRS resources associated with the SRS resource set are a periodic SRS resource, a semi-persistent SRS resource, or an aperiodic SRS resource.

Aspect 26: The method of any of Aspects 1-25, further comprising: transmitting an indication of a capability of the UE to maintain intra slot phase coherency between SRS symbols associated with the SRS resource set, wherein the configuration information is based at least in part on the capability.

Aspect 27: The method of Aspect 26, wherein transmitting the indication of the capability comprises: transmitting an indication of whether the UE is capable of maintaining phase coherence between two non-consecutive symbols associated with a Doppler tracking SRS when a downlink communication is received by the UE during one or more symbols between the two non-consecutive symbols.

Aspect 28: The method of any of Aspects 26-27, wherein transmitting the indication of the capability comprises: transmitting an indication of whether the UE is capable of maintaining phase coherence between two non-consecutive symbols associated with a Doppler tracking SRS when an uplink communication is transmitted by the UE during one or more symbols between the two non-consecutive symbols.

Aspect 29: The method of Aspect 28, wherein transmitting the indication of the capability comprises: transmitting an indication of whether the UE is capable of maintaining phase coherence between two non-consecutive symbols associated with the Doppler tracking SRS when the uplink communication is associated with a different transmit power level than a transmit power level associated with symbols used for the Doppler tracking SRS.

Aspect 30: The method of any of Aspects 28-29, wherein transmitting the indication of the capability comprises: transmitting an indication of whether the UE is capable of maintaining phase coherence between two non-consecutive symbols associated with the Doppler tracking SRS when the uplink communication transmitted by the UE is associated with a different carrier frequency than a carrier frequency associated with the Doppler tracking SRS.

Aspect 31: The method of any of Aspects 26-30, wherein transmitting the indication of the capability comprises: transmitting an indication that the UE is capable of maintaining phase coherence between two non-consecutive symbols associated with a Doppler tracking SRS only when no communications are transmitted or received by the UE between the two non-consecutive symbols.

Aspect 32: The method of Aspect 31, wherein transmitting the indication of the capability comprises: transmitting an indication of a permissible time gap between the two non-consecutive symbols.

Aspect 33: The method of any of Aspects 1-32, wherein receiving the configuration information comprises: receiving a radio resource control (RRC) configuration indicating the configuration information.

Aspect 34: The method of any of Aspects 1-33, wherein transmitting the one or more SRSs implicitly signals one or more Doppler parameters for an uplink channel.

Aspect 35: The method of any of Aspects 1-34, wherein receiving the configuration information comprises: receiving an indication of an SRS resource identifier associated with the SRS resource set; and receiving an indication of occupied symbols for the SRS resource identifier via a bitmap configuration.

Aspect 36: A method of wireless communication performed by a network entity, comprising: transmitting, to a user equipment (UE), configuration information for a sounding reference signal (SRS) resource set, the configuration information indicating a usage type for the SRS resource set associated with Doppler tracking and a configuration for one or more SRS resource identifiers; and receiving one or more SRSs in accordance with the configuration information for the SRS resource set based at least in part on transmitting the configuration information.

Aspect 37: The method of Aspect 36, further comprising: measuring the one or more SRSs to estimate a Doppler shift or a frequency offset for a channel.

Aspect 38: The method of any of Aspects 36-37, further comprising: measuring the one or more SRSs to estimate a Doppler spread or a time coherence for a channel.

Aspect 39: The method of any of Aspects 36-38, further comprising: determining the configuration information based at least in part on at least one of a carrier frequency, a subcarrier spacing, a channel condition, a channel type, or movement information associated with the UE.

Aspect 40: The method of any of Aspects 36-39, wherein transmitting the configuration information comprises: transmitting an indication of two or more SRS resource identifiers associated with the SRS resource set; and transmitting, for each SRS resource identifier of the two or more SRS resource identifiers, an indication of an intra-slot start position for an SRS resource associated with each SRS resource identifier of the two or more SRS identifiers.

Aspect 41: The method of Aspect 40, wherein the transmitting the configuration information comprises: transmitting an indication that each of the two or more SRS identifiers are configured to use a single symbol.

Aspect 42: The method of any of Aspects 36-41, wherein transmitting the configuration information comprises: transmitting an indication of the one or more SRS resource identifiers associated with the SRS resource set; and transmitting, for each SRS resource identifier of the one or more SRS resource identifiers, an indication of an intra-slot start position, a number of repetitions, and a number of symbols for an SRS resource associated with each SRS resource identifier.

Aspect 43: The method of Aspect 42, wherein transmitting the configuration information comprises: transmitting an indication that an SRS resource identifier of the one or more SRS resource identifiers is associated with at least one of: one symbol and one repetition, or two symbols and two repetitions.

Aspect 44: The method of any of Aspects 36-43, wherein transmitting the configuration information comprises: transmitting an indication that SRS resource identifiers associated with the SRS resource set are configured to use a single port.

Aspect 45: The method of any of Aspects 36-44, wherein transmitting the configuration information comprises: transmitting an indication that SRS resource identifiers associated with the SRS resource set are configured to use multiple ports.

Aspect 46: The method of any of Aspects 36-45, wherein transmitting the configuration information comprises: transmitting an indication of an SRS resource identifier associated with the SRS resource set; and transmitting an indication of multiple intra-slot start positions associated with the SRS resource identifier using a configuration field associated with the SRS resource identifier.

Aspect 47: The method of Aspect 46, wherein a number of the multiple intra-slot start positions indicates a number of symbols associated with the SRS resource identifier.

Aspect 48: The method of any of Aspects 46-47, wherein the configuration information does not indicate information associated with a repetition factor or a number of symbols for the SRS resource identifier.

Aspect 49: The method of any of Aspects 36-48, wherein transmitting the configuration information comprises: transmitting an indication of an SRS resource identifier associated with the SRS resource set; transmitting an indication of an intra-slot start position associated with the SRS resource identifier; and transmitting an indication of occupied symbols for the SRS resource identifier based at least in part on the intra-slot start position.

Aspect 50: The method of Aspect 49, wherein transmitting the indication of the occupied symbols for the SRS resource identifier comprises: transmitting an indication of a bitmap configuration indicating the occupied symbols for the SRS resource identifier, wherein the indication of an intra-slot start position indicates a starting position for the bitmap configuration relative to an end of a slot.

Aspect 51: The method of Aspect 50, further comprising: configuring non-zero elements included in the bitmap configuration to indicate occupied symbols within a slot starting from the symbol indicated by the intra-slot start position.

Aspect 52: The method of any of Aspects 36-51, wherein transmitting the configuration information comprises: transmitting an indication that the SRS resource set is a periodic SRS resource set or that the one or more SRS resource identifiers are periodic SRS resources.

Aspect 53: The method of any of Aspects 36-51, wherein transmitting the configuration information comprises: transmitting an indication that the SRS resource set is a semi-persistent SRS resource set or that the one or more SRS resource identifiers are semi-persistent SRS resources.

Aspect 54: The method of any of Aspects 36-51, wherein transmitting the configuration information comprises: transmitting an indication that the SRS resource set is an aperiodic SRS resource set or that the one or more SRS resource identifiers are aperiodic SRS resources.

Aspect 55: The method of any of Aspects 36-54, further comprising: transmitting reconfiguration information associated with the SRS resource set or at least one of the one or more SRS resource identifiers, wherein the reconfiguration information modifies one or more parameters indicated by the configuration information.

Aspect 56: The method of Aspect 55, further comprising: determining the reconfiguration information based at least in part on at least one of a carrier frequency, a subcarrier spacing, a channel condition, a channel type, or movement information associated with the UE.

Aspect 57: The method of any of Aspects 55-56, wherein transmitting the reconfiguration information comprises: transmitting one or more medium access control (MAC) control element (MAC-CE) messages indicating the reconfiguration information.

Aspect 58: The method of any of Aspects 55-57, wherein transmitting the reconfiguration information comprises: transmitting an indication of a modified intra-slot start position for one or more SRS resources indicated by the configuration information.

Aspect 59: The method of any of Aspects 55-58, wherein transmitting the reconfiguration information comprises: transmitting an indication of an activation or a deactivation for one or more SRS resources indicated by the configuration information.

Aspect 60: The method of any of Aspects 55-59, wherein transmitting the reconfiguration information comprises: transmitting an indication of a modified intra-slot start position field for an SRS resource, wherein the modified intra-slot start position field indicates multiple intra-slot start positions for the SRS resource.

Aspect 61: The method of Aspect 60, wherein the indication of the modified intra-slot start position field indicates a different number of intra-slot start positions for the SRS resource than a number of intra-slot start positions indicated by an intra-slot start position field indicated by the configuration information or previous reconfiguration information.

Aspect 62: The method of any of Aspects 55-61, wherein transmitting the reconfiguration information comprises: transmitting an indication of a modified bitmap configuration indicating occupied symbols for an SRS resource indicated by the configuration information.

Aspect 63: The method of Aspect 62, wherein the modified bitmap configuration is associated with a size that is different than a size of a bitmap configuration indicated by the configuration information.

Aspect 64: The method of any of Aspects 55-63, wherein the SRS resource set or the one or more SRS resource identifiers is a periodic SRS resource, a semi-persistent SRS resource, or an aperiodic SRS resource.

Aspect 65: The method of any of Aspects 36-64, further comprising: receiving an indication of capability of the UE to maintain intra slot phase coherency between SRS symbols associated with the SRS resource set.

Aspect 66: The method of Aspect 65, further comprising: determining the configuration information is based at least in part on the capability of the UE.

Aspect 67: The method of any of Aspects 65-66, wherein receiving the indication of the capability comprises: receiving an indication of whether the UE is capable of maintaining phase coherence between two non-consecutive symbols associated with a Doppler tracking SRS when a downlink communication is received by the UE during one or more symbols between the two non-consecutive symbols.

Aspect 68: The method of any of Aspects 65-67, wherein receiving the indication of the capability comprises: receiving an indication of whether the UE is capable of maintaining phase coherence between two non-consecutive symbols associated with a Doppler tracking SRS when an uplink communication is transmitted by the UE during one or more symbols between the two non-consecutive symbols.

Aspect 69: The method of Aspect 68, wherein receiving the indication of the capability comprises: receiving an indication of whether the UE is capable of maintaining phase coherence between two non-consecutive symbols associated with the Doppler tracking SRS when the uplink communication is associated with a different transmit power level than a transmit power level associated with symbols used for the Doppler tracking SRS.

Aspect 70: The method of any of Aspects 68-69, wherein receiving the indication of the capability comprises: receiving an indication of whether the UE is capable of maintaining phase coherence between two non-consecutive symbols associated with the Doppler tracking SRS when the uplink communication transmitted by the UE is associated with a different carrier frequency than a carrier frequency associated with the Doppler tracking SRS.

Aspect 71: The method of any of Aspects 65-70, wherein receiving the indication of the capability comprises: receiving an indication that the UE is capable of maintaining phase coherence between two non-consecutive symbols associated with a Doppler tracking SRS only when no communications are transmitted or received by the UE between the two non-consecutive symbols.

Aspect 72: The method of Aspect 71, wherein receiving the indication of the capability comprises: receiving an indication of a permissible time gap between the two non-consecutive symbols.

Aspect 73: The method of any of Aspects 36-72, wherein transmitting the configuration information comprises: transmitting a radio resource control (RRC) configuration indicating the configuration information.

Aspect 74: The method of any of Aspects 36-73, wherein receiving the one or more SRSs implicitly signals one or more Doppler parameters for an uplink channel.

Aspect 75: The method of any of Aspects 36-74, wherein transmitting the configuration information comprises: transmitting an indication of an SRS resource identifier associated with the SRS resource set; and transmitting an indication of occupied symbols for the SRS resource identifier via a bitmap configuration.

Aspect 76: An apparatus for wireless communication at a device, comprising a processor; memory coupled with the processor; and instructions stored in the memory and executable by the processor to cause the apparatus to perform the method of one or more of Aspects 1-35.

Aspect 77: A device for wireless communication, comprising a memory and one or more processors coupled to the memory, the memory and the one or more processors configured to perform the method of one or more of Aspects 1-35.

Aspect 78: An apparatus for wireless communication, comprising at least one means for performing the method of one or more of Aspects 1-35.

Aspect 79: A non-transitory computer-readable medium storing code for wireless communication, the code comprising instructions executable by a processor to perform the method of one or more of Aspects 1-35.

Aspect 80: A non-transitory computer-readable medium storing a set of instructions for wireless communication, the set of instructions comprising one or more instructions that, when executed by one or more processors of a device, cause the device to perform the method of one or more of Aspects 1-35.

Aspect 81: An apparatus for wireless communication at a device, comprising a processor; memory coupled with the processor; and instructions stored in the memory and executable by the processor to cause the apparatus to perform the method of one or more of Aspects 36-75.

Aspect 82: A device for wireless communication, comprising a memory and one or more processors coupled to the memory, the memory and the one or more processors configured to perform the method of one or more of Aspects 36-75.

Aspect 83: An apparatus for wireless communication, comprising at least one means for performing the method of one or more of Aspects 36-75.

Aspect 84: A non-transitory computer-readable medium storing code for wireless communication, the code comprising instructions executable by a processor to perform the method of one or more of Aspects 36-75.

Aspect 85: A non-transitory computer-readable medium storing a set of instructions for wireless communication, the set of instructions comprising one or more instructions that, when executed by one or more processors of a device, cause the device to perform the method of one or more of Aspects 36-75.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more memories comprising instructions executable by the one or more processors to cause the UE to:
transmit an indication of a capability of the UE to maintain intra slot phase coherency between sounding reference signal (SRS) symbols associated with an SRS resource set;
receive configuration information for the SRS resource set, the configuration information indicating a usage type for the SRS resource set associated with Doppler tracking and a configuration for one or more SRS resource identifiers; and
transmit one or more SRSs in accordance with the configuration information for the SRS resource set based at least in part on receiving the configuration information.

2. The UE of claim 1, wherein the instructions, executable to cause the UE to receive the configuration information, are executable to cause the UE to:
receive an indication of the one or more SRS resource identifiers associated with the SRS resource set; and
receive, for each SRS resource identifier of the one or more SRS resource identifiers, an indication of an intra-slot start position, a number of repetitions, and a number of symbols for an SRS resource associated with each SRS resource identifier.

3. The UE of claim 2, wherein the instructions, executable to cause the UE to receive the configuration information, are executable to cause the UE to:
receive an indication that an SRS resource identifier of the one or more SRS resource identifiers is associated with at least one of: one symbol and one repetition, or two symbols and two repetitions.

4. The UE of claim 1, wherein the instructions, executable to cause the UE to receive the configuration information, are executable to cause the UE to:
receive an indication that SRS resource identifiers associated with the SRS resource set are configured to use a single port.

5. The UE of claim 1, wherein the instructions, executable to cause the UE to receive the configuration information, are executable to cause the UE to:
receive an indication of an SRS resource identifier associated with the SRS resource set; and
receive an indication of multiple intra-slot start positions associated with the SRS resource identifier using a single configuration field associated with the SRS resource identifier.

6. The UE of claim 5, wherein a number of the multiple intra-slot start positions indicates a number of symbols associated with the SRS resource identifier, and wherein the configuration information does not indicate information associated with a repetition factor or a number of symbols for the SRS resource identifier.

7. The UE of claim 1, wherein the instructions, executable to cause the UE to receive the configuration information, are executable to cause the UE to:
receive an indication of an SRS resource identifier associated with the SRS resource set;
receive an indication of an intra-slot start position associated with the SRS resource identifier; and
receive an indication of occupied symbols for the SRS resource identifier based at least in part on the intra-slot start position.

8. The UE of claim 7, wherein the instructions, executable to cause the UE to receive the indication of the occupied symbols for the SRS resource identifier, are executable to cause the UE to:
receive an indication of a bitmap configuration indicating the occupied symbols for the SRS resource identifier, wherein the indication of an intra-slot start position indicates a starting position for the bitmap configuration relative to an end of a slot.

9. The UE of claim 1, wherein the instructions, executable to cause the UE to receive the configuration information, are executable to cause the UE to:
receive an indication that:
the SRS resource set is a periodic SRS resource set or that the one or more SRS resource identifiers are periodic SRS resources;
the SRS resource set is a semi-persistent SRS resource set or that the one or more SRS resource identifiers are semi-persistent SRS resources; or
the SRS resource set is an aperiodic SRS resource set or that the one or more SRS resource identifiers are aperiodic SRS resources.

10. The UE of claim 1, wherein the instructions stored in the one or more memories are further executable to cause the UE to:
receive, via one or more medium access control (MAC) control element (MAC-CE) messages, reconfiguration information associated with the SRS resource set or at least one of the one or more of the SRS resource identifiers, wherein the reconfiguration information modifies one or more parameters indicated by the configuration information.

11. The UE of claim 10, wherein the instructions, executable to cause the UE to receive the reconfiguration information, are executable to cause the UE to:
receive an indication of at least one of:
a modified intra-slot start position for one or more SRS resources indicated by the configuration information;
an activation or a deactivation for one or more SRS resources indicated by the configuration information;
a modified intra-slot start position field for an SRS resource, wherein the modified intra-slot start position field indicates multiple intra-slot start positions for the SRS resource; or
a modified bitmap configuration indicating occupied symbols for an SRS resource indicated by the configuration information.

12. The UE of claim 11, wherein the indication of the modified intra-slot start position field indicates a different number of intra-slot start positions for the SRS resource than a number of intra-slot start positions indicated by an intra-slot start position field indicated by the configuration information or previous reconfiguration information.

13. The UE of claim 11, wherein the modified bitmap configuration is associated with a size that is different than a size of a bitmap configuration indicated by the configuration information.

14. The UE of claim 1,
wherein the configuration information is based at least in part on the capability, and wherein the capability is associated with at least one of:
whether the UE is capable of maintaining phase coherence between two non-consecutive symbols associated with a Doppler tracking SRS when a downlink communication is received by the UE during one or more symbols between the two non-consecutive symbols;
whether the UE is capable of maintaining phase coherence between the two non-consecutive symbols associated with the Doppler tracking SRS when an uplink communication is transmitted by the UE during the one or more symbols between the two non-consecutive symbols;
whether the UE is capable of maintaining phase coherence between the two non-consecutive symbols associated with the Doppler tracking SRS when the uplink communication is associated with a different transmit power level than a transmit power level associated with symbols used for the Doppler tracking SRS;
whether the UE is capable of maintaining phase coherence between the two non-consecutive symbols associated with the Doppler tracking SRS when the uplink communication transmitted by the UE is associated with a different carrier frequency than a carrier frequency associated with the Doppler tracking SRS;
whether the UE is capable of maintaining phase coherence between the two non-consecutive symbols associated with the Doppler tracking SRS; or
a permissible time gap between the two non-consecutive symbols.

15. The UE of claim 1, wherein transmitting the one or more SRSs implicitly signals one or more Doppler parameters for an uplink channel.

16. A method of wireless communication performed by a user equipment (UE), comprising:
transmitting an indication of a capability of the UE to maintain intra slot phase coherency between SRS symbols associated with a sounding reference signal (SRS) resource set;
receiving configuration information for the SRS resource set, the configuration information indicating a usage type for the SRS resource set associated with Doppler tracking and a configuration for one or more SRS resource identifiers; and
transmitting one or more SRSs in accordance with the configuration information for the SRS resource set based at least in part on receiving the configuration information.

17. The method of claim 16, wherein receiving the configuration information comprises:
receiving an indication of the one or more SRS resource identifiers associated with the SRS resource set; and
receiving, for each SRS resource identifier of the one or more SRS resource identifiers, an indication of an intra-slot start position, a number of repetitions, and a number of symbols for an SRS resource associated with each SRS resource identifier.

18. The method of claim 16, wherein receiving the configuration information comprises:
receiving an indication that SRS resource identifiers associated with the SRS resource set are configured to use a single port or multiple ports.

19. The method of claim 16, wherein receiving the configuration information comprises:
receiving an indication of an SRS resource identifier associated with the SRS resource set; and
receiving an indication of multiple intra-slot start positions associated with the SRS resource identifier using a single configuration field associated with the SRS resource identifier.

20. The method of claim 19, wherein a number of the multiple intra-slot start positions indicates a number of symbols associated with the SRS resource identifier.

21. The method of claim 16, wherein receiving the configuration information comprises:
receiving an indication of an SRS resource identifier associated with the SRS resource set;
receiving an indication of an intra-slot start position associated with the SRS resource identifier; and receiving an indication of occupied symbols for the SRS resource identifier based at least in part on the intra-slot start position.

22. The method of claim 21, wherein receiving the indication of the occupied symbols for the SRS resource identifier comprises:

receiving an indication of a bitmap configuration indicating the occupied symbols for the SRS resource identifier, wherein the indication of an intra-slot start position indicates a starting position for the bitmap configuration relative to an end of a slot, wherein non-zero elements included in the bitmap configuration indicate occupied symbols within a slot starting from the symbol indicated by the intra-slot start position.

23. The method of claim 16, wherein receiving the configuration information comprises:

receiving an indication that:
the SRS resource set is a periodic SRS resource set or that the one or more SRS resource identifiers are periodic SRS resources;
the SRS resource set is a semi-persistent SRS resource set or that the one or more SRS resource identifiers are semi-persistent SRS resources; or
the SRS resource set is an aperiodic SRS resource set or that the one or more SRS resource identifiers are aperiodic SRS resources.

24. The method of claim 16, further comprising:
receiving, via one or more medium access control (MAC) control element (MAC-CE) messages, reconfiguration information associated with the SRS resource set or at least one of the one or more of the SRS resource identifiers, wherein the reconfiguration information modifies one or more parameters indicated by the configuration information.

25. The method of claim 24, wherein receiving the reconfiguration information comprises:

receiving an indication of at least one of:
a modified intra-slot start position for one or more SRS resources indicated by the configuration information;
an activation or a deactivation for one or more SRS resources indicated by the configuration information;
a modified intra-slot start position field for an SRS resource, wherein the modified intra-slot start position field indicates multiple intra-slot start positions for the SRS resource; or
a modified bitmap configuration indicating occupied symbols for an SRS resource indicated by the configuration information.

26. The method of claim 25, wherein the indication of the modified intra-slot start position field indicates a different number of intra-slot start positions for the SRS resource than a number of intra-slot start positions indicated by an intra-slot start position field indicated by the configuration information or previous reconfiguration information.

27. The method of claim 25, wherein the one or more SRS resources associated with the SRS resource set are a periodic SRS resource, a semi-persistent SRS resource, or an aperiodic SRS resource.

28. The method of claim 16,
wherein the configuration information is based at least in part on the capability.

29. A non-transitory computer-readable medium storing one or more instructions for wireless communication, the one or more instructions, when executed by one or more processors of a user equipment (UE), cause the UE to:

transmit an indication of a capability of the UE to maintain intra slot phase coherency between sounding reference signal (SRS) symbols associated with an SRS resource set;

receive configuration information for the SRS resource set, the configuration information indicating a usage type for the SRS resource set associated with Doppler tracking and a configuration for one or more SRS resource identifiers; and transmit one or more SRSs in accordance with the configuration information for the SRS resource set based at least in part on receiving the configuration information.

30. An apparatus for wireless communication, comprising:

means for transmitting an indication of a capability of a user equipment (UE) to maintain intra slot phase coherency between sounding reference signal (SRS) symbols associated with an SRS resource set;

means for receiving configuration information for the SRS resource set, the configuration information indicating a usage type for the SRS resource set associated with Doppler tracking and a configuration for one or more SRS resource identifiers; and means for transmitting one or more SRSs in accordance with the configuration information for the SRS resource set based at least in part on receiving the configuration information.

* * * * *